US008678147B2

(12) United States Patent  (10) Patent No.: US 8,678,147 B2
Usui  (45) Date of Patent: Mar. 25, 2014

(54) ELECTRIC BRAKE

(75) Inventor: Takuya Usui, Minami Alps (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 12/630,109

(22) Filed: Dec. 3, 2009

(65) Prior Publication Data

US 2010/0101900 A1    Apr. 29, 2010

Related U.S. Application Data

(62) Division of application No. 11/087,578, filed on Mar. 24, 2005, now Pat. No. 7,677,367.

(30) Foreign Application Priority Data

Mar. 31, 2004  (JP) ................................ 2004-106797
Feb. 28, 2005  (JP) ................................ 2005-055082

(51) Int. Cl.
 *F16D 65/28*    (2006.01)
(52) U.S. Cl.
 USPC ................ 188/156; 188/196 A; 188/196 BA; 188/72.1; 188/72.3
(58) Field of Classification Search
 USPC ................. 188/156, 196 A, 196 B, 72.3, 72.1
 See application file for complete search history.

(56) References Cited

U.S. PATENT DOCUMENTS

| 2,170,238 A | | 8/1939 | Farmer | |
| 2,562,356 A | * | 7/1951 | House | 188/78 |
| 3,858,463 A | * | 1/1975 | Klavonich | 81/484 |
| 4,321,844 A | * | 3/1982 | Krill | 81/484 |
| 4,919,237 A | | 4/1990 | Yamazaki | |
| 6,138,801 A | | 10/2000 | Shirai et al. | |
| 6,230,854 B1 | | 5/2001 | Schwarz et al. | |
| 6,267,207 B1 | | 7/2001 | Fleischer et al. | |

(Continued)

FOREIGN PATENT DOCUMENTS

| JP | 2000-055092 | 2/2000 |
| JP | 2001-204154 | 7/2001 |

(Continued)

OTHER PUBLICATIONS

Partial English translation of Japanese Office Action issued on Oct. 7, 2009 in Japanese Patent Application No. 2005-055082, a foreign counterpart of the present application.
Japanese Office Action (and partial English translation) issued Aug. 24, 2011 in Japanese counterpart Application No. 2009-278000.

*Primary Examiner* — Robert A Siconolfi
*Assistant Examiner* — Mahbubur Rashid
(74) *Attorney, Agent, or Firm* — Wenderoth, Lind & Ponack, L.L.P.

(57) ABSTRACT

In an electric brake of the present invention, a plunger of an actuator is connected through a pin to a pivot arm to which an engaging pawl engageable with a tooth portion of a ratchet is pivotably attached. A lower surface (a force-receiving portion) of the pin is adapted to receive an upward force which is applied by a tool inserted through a bolt hole threadably engaged with a watertight bolt. When the parking brake is operated (the engaging pawl is engaged with the tooth portion of the ratchet), if supply of current to the coil becomes impossible, the pin is moved upward by means of the tool, to thereby separate the engaging pawl from the tooth portion. Therefore, an emergency action to release the parking brake can be manually conducted.

20 Claims, 12 Drawing Sheets

(56) References Cited

U.S. PATENT DOCUMENTS

| | | |
|---|---|---|
| 6,349,801 B1 | 2/2002 | Koth et al. |
| 6,364,085 B1 | 4/2002 | Ueno et al. |
| 6,491,140 B2 | 12/2002 | Usui et al. |
| 6,626,270 B2 * | 9/2003 | Drennen et al. ............ 188/72.1 |
| 6,802,398 B2 | 10/2004 | Drennen et al. |
| 6,915,883 B2 | 7/2005 | Watanabe et al. |
| 2003/0066719 A1 | 4/2003 | Watanabe et al. |
| 2005/0077782 A1 | 4/2005 | Horiuchi et al. |

FOREIGN PATENT DOCUMENTS

| | | |
|---|---|---|
| JP | 2001-355661 | 12/2001 |
| JP | 2003-42199 | 2/2003 |
| JP | 2003-343620 | 12/2003 |
| JP | 2005-9633 | 1/2005 |
| JP | 2005-114042 | 4/2005 |

* cited by examiner

ELECTRIC BRAKE

This is a divisional application of U.S. patent application Ser. No. 11/087,578, filed Mar. 24, 2005 now U.S. Pat. No. 7,677,367.

BACKGROUND OF THE INVENTION

1. Field of the Invention

The present invention relates to an electric brake for generating a braking force according to a torque of a motor. More specifically, the present invention relates to an electric brake provided with a parking brake function.

2. Description of Related Art

As an example of an electric brake, there can be mentioned an electric brake comprising a caliper having provided therein a piston, an electric motor and a rotary-linear motion conversion mechanism for enabling rotation of the motor to be converted to a linear motion and transmitted to the piston. A thrust is given to the piston according to rotation of a rotor of the motor, to thereby press a brake pad against a disc rotor, thus generating a braking force. Normally, in this electric brake, a driver's force applied to a brake pedal, or a stroke of the brake pedal, is detected by a sensor, and rotation (an angle of rotation) of the motor is controlled based on a value detected by the sensor, to thereby obtain a desired braking force.

Recently, various attempts have been made to increase an advantage of such an electric brake by providing therein a parking brake (PKB) mechanism.

For example, there exists an electric brake having a parking brake mechanism, in which when an actuator coil of the parking brake mechanism is deenergized, an actuator plunger is retracted under force of a compression spring, so that a pivot arm having an engaging pawl is placed in an initial upright position and engages a tooth portion of a ratchet, to thereby place the parking brake in an active state. When the actuator coil is energized, the actuator plunger is advanced (an extension stroke), to thereby effect disengagement of the engaging pawl of the pivot arm from the tooth portion of the ratchet and thus release the parking brake (see FIGS. 6 to 8 of Japanese Patent Application Public Disclosure No. 2003-42199).

Further, there is disclosed another example of an electric brake having a parking brake mechanism. In this example, to apply the parking brake, an actuator plunger is advanced (an extension stroke) by energizing an actuator coil, to thereby engage an engaging pawl with a tooth portion of a ratchet against a force of a tension spring. To release the parking brake, the electric motor is operated in a direction for braking while the actuator coil is deenergized, to thereby loosen the engagement between the engaging pawl and the tooth portion of the ratchet. As a result, the engaging pawl is pulled by the tension spring and disengaged from the tooth portion of the ratchet, thus releasing the parking brake (see FIGS. 9 and 10 of Japanese Patent Application Public Disclosure No. 2003-42199).

In these prior art techniques, if the actuator or the electric motor malfunctions, or the supply of current to the coil becomes impossible due to malfunctioning of a component for supplying a current to the actuator or the motor when the parking brake mechanism is operated (when the parking brake is applied), the engaging pawl is continuously held on the ratchet. In this case, the parking brake cannot be released if no countermeasure is taken, and the vehicle cannot be moved even as a temporary action. Therefore, it is desirable to solve the above-mentioned problem of the prior art techniques.

In view of the above, the present invention has been made. It is an object of the present invention to provide an electric brake having a parking brake function, which enables the parking brake to be readily released even in the case of malfunctioning of the actuator or the motor, or a failure of supply of current to the actuator or the motor.

SUMMARY OF THE INVENTION

The present invention provides an electric brake comprising:

a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force;

a parking brake mechanism including an engaging structure capable of being engaged with an associated-movement portion which operates in association with the motor, the parking brake mechanism being capable of exerting a parking brake function through engagement and disengagement of the engaging structure relative to the associated-movement portion; and an actuator including a coil and a plunger capable of displacement under an electromagnetic force generated by energization of the coil, the actuator being adapted to enable the engagement or the disengagement of the engaging structure relative to the associated-movement portion according to the displacement of the plunger;

the plunger or the engaging structure being provided with a force-receiving portion, the force-receiving portion being adapted to receive a force to thereby enable the disengagement of the engaging structure relative to the associated-movement portion, an opening for insertion of a force-applying member for applying a force to the force-receiving portion being formed in a housing for accommodating the parking brake mechanism.

The present invention also provides an electric brake comprising:

a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force; and a parking brake mechanism including an engaging structure capable of being engaged with an associated-movement portion which operates in association with the motor, the parking brake mechanism being capable of exerting a parking brake function through engagement and disengagement of the engaging structure relative to the associated-movement portion, the disengagement of the engaging structure being effected by operating the motor to temporarily rotate the associated-movement portion in a direction for braking, a force-receiving portion being provided in the associated-movement portion, the force-receiving portion being adapted to receive a force to thereby enable the disengagement of the engaging structure relative to the associated-movement portion, an opening for insertion of a force-applying member for applying a force to the force-receiving portion being formed in a housing for accommodating the parking brake mechanism.

In the first-described electric brake, the opening for insertion of the force-applying member for applying a force to the force-receiving portion provided in the plunger or the engaging structure is formed in the housing for accommodating the parking brake mechanism. Therefore, if the actuator or the motor malfunctions, or the supply of current to the actuator or the motor becomes impossible when the parking brake is applied, it is possible to apply a force to the force-receiving portion by inserting the force-applying member through the opening, to thereby disengage the engaging structure from the associated-movement portion.

In the second-described electric brake, the force-receiving portion, which is adapted to receive a force to thereby disengage the engaging structure from the associated-movement portion, is provided in the associated-movement portion, and the opening for insertion of the force-applying member is formed in the housing for accommodating the parking brake mechanism. Therefore, if the motor malfunctions, or a failure of supplying a current to the motor occurs when the parking brake is applied, it is possible to apply a force to the force-receiving portion in the associated-movement portion by inserting the force-applying member through the opening, to thereby disengage the engaging structure from the associated-movement portion.

DETAILED DESCRIPTION OF THE INVENTION

Figure 1:
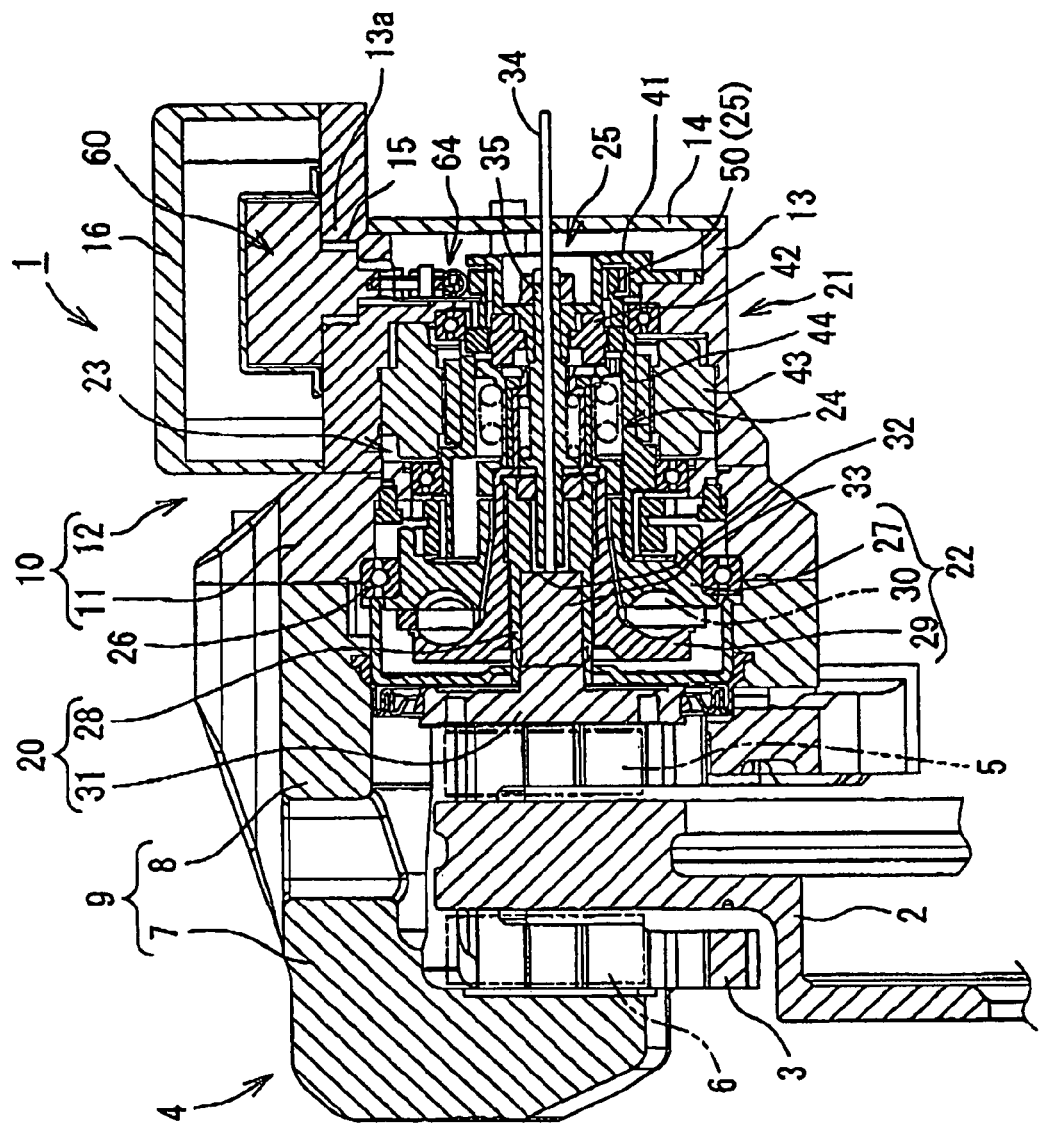
FIG. 1 is a cross-sectional view showing an entire construction of an electric brake according to a first embodiment of the present invention.

Referring to FIGS. 1 to 5, an electric brake according to a first embodiment of the present invention is described below. In FIGS. 1 to 4, an electric brake 1 comprises a caliper 4 supported by a carrier 3 that is fixed to a non-rotational portion (such as a knuckle) of a vehicle body on an inner side of the vehicle body relative to a disc rotor 2. The caliper 4 is supported in a state such that it is capable of a floating movement in an axial direction of the disc rotor 2. A pair of brake pads 5 and 6 are disposed so as to face each other with the disc rotor 2 being provided therebetween. The brake pads 5 and 6 are supported by the carrier 3 in such a manner as to allow a movement of the brake pads 5 and 6 in the axial direction of the disc rotor 2.

The caliper 4 comprises a claw member 9 and a caliper body 10 connected to the claw member 9. The claw member 9 includes a claw portion 7 formed on a forward end thereof and an annular base body 8 formed on a basal end thereof. The claw portion 7 is disposed so as to face the brake pad 6 on an outer side of the vehicle body. The caliper body 10 comprises an annular body 11 connected to the annular base body 8 of the claw member 9 and a motor case 12 connected to the annular body 11. The motor case 12 comprises a motor case body 13 in a cylindrical form connected to the annular body 11, a motor end plate 14 covering an open end of the motor case body 13 and a housing 16 disposed at a portion 13a of a side wall of the motor case body 13, at which a hole 15 is formed (the portion 13a is hereinafter referred to as "the hole forming portion 13a").

In the caliper 4, there are provided a piston 20 comprising separable parts, which is adapted to press the brake pad 5 (on an inner side of the vehicle body) against the disc rotor 2, a motor 21, a ball ramp mechanism (a rotary-linear motion converting mechanism) 22 for enabling rotation of the motor 21 to be converted to a linear motion and transmitted to the piston 20, a differential reduction mechanism 23 for enabling the rotation of the motor 21 to be reduced and transmitted to the ball ramp mechanism 22, a pad wear compensation mechanism 24 for compensating for an amount of wear of the brake pads 5 and 6 by changing a position of the piston 20 in relation to the amount of wear, and a parking brake mechanism 25 for securing the parking brake. The caliper 4 is also provided with an actuator 60 adapted to switch an operation of the parking brake mechanism 25 between a locking action and an unlocking action by selectively supplying currents of different polarities to the parking brake mechanism 25 for a short period of time.

The ball ramp mechanism 22 comprises a first disc 27 in a ring-like form which is pivotably supported by an inner circumferential surface of a connecting portion of the annular base body 8 and the annular body 11 of the caliper 4 through a bearing 26, a second disc 29 in a ring-like form having an inner space and being connected to a cylindrical portion 28 of the piston 20 which is inserted into the inner space, and balls 30 disposed between the discs 27 and 29. The second disc 29 is held while being suppressed for rotating. The second disc 29 is adapted to convert a force of rotation received from the first disc 27 through the balls 30 to a linear motion and transmit the linear motion to the piston 20.

The piston 20 comprises the separable parts, namely, the cylindrical portion 28 and a piston body 31 having a larger diameter than the cylindrical portion 28. The piston body 31 is adapted to receive a force from the cylindrical portion 28 and hence the ball ramp mechanism 22 (and hence the motor 21). The cylindrical portion 28 is supported by a support cylinder 35 (described later) through a piston engaging member (no reference numeral therefor is indicated) while being prevented from rotation. A reactive force sensor 33 is provided between the piston body 31 and a closed end 32 of a hollow portion formed in the cylindrical portion 28 on a side of the piston body 31, so as to detect a reactive force from the piston body 31. A signal wire 34 of the reactive force sensor 33 is inserted through the support cylinder 35 and connected to a controller 40 provided in the vehicle body. The support cylinder 35 is supported by the motor case 12 through a cylindrical support member 41.

The motor 21 comprises a stator 43 fixed in a fitted relationship to the motor case 12 and a rotor 44 having a hollow structure disposed within the stator 43. The rotor 44 is rotatably supported by the motor case 12. The motor 21 is operated according to a command signal from the controller 40 so as to rotate the rotor 44 through a desired angle with a desired torque. The angle of rotation of the rotor 44 is detected by a position detector 42 (such as a resolver) disposed in the rotor 44. In this embodiment, in response to a command signal from the controller 40 for generating a braking force, the motor 21 rotates the rotor 44 in a counter-clockwise direction L in FIG. 2. The controller 40 controls not only the motor 21, but also the actuator 60, and hence the parking brake mechanism 25, through a drive circuit 70.

Figure 2:
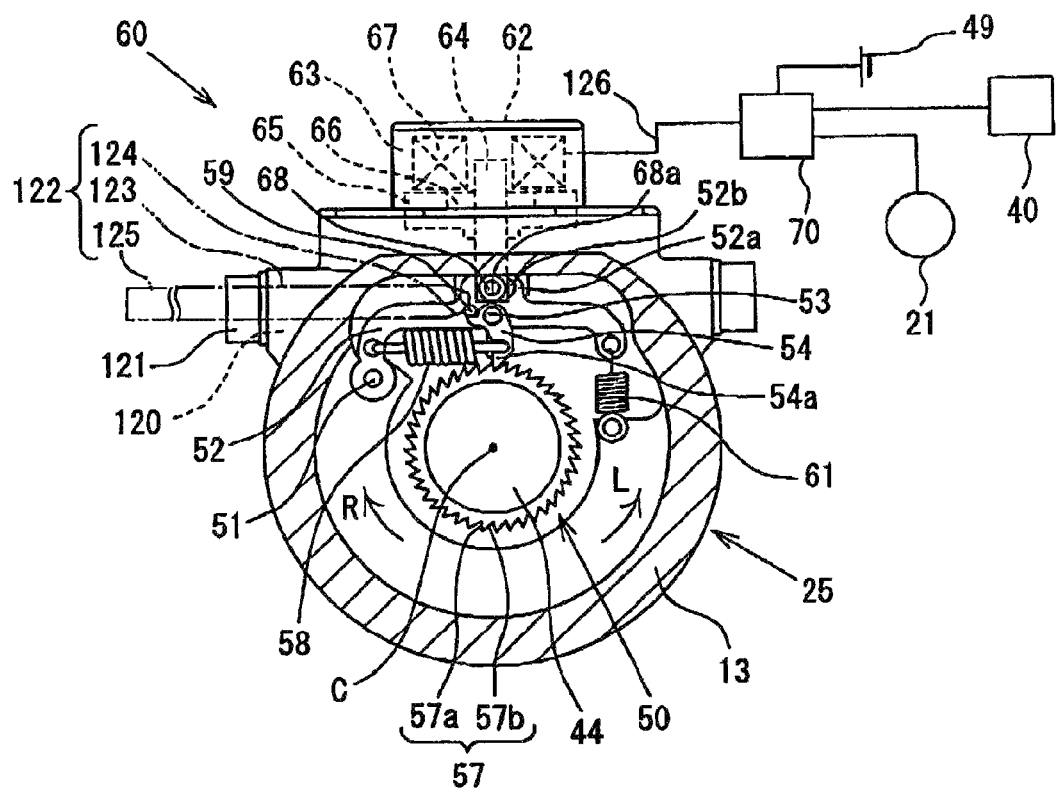
FIG. 2 is a schematic view showing a parking brake mechanism, an actuator and a drive circuit in the electric brake of FIG. 1.
Figure 3:
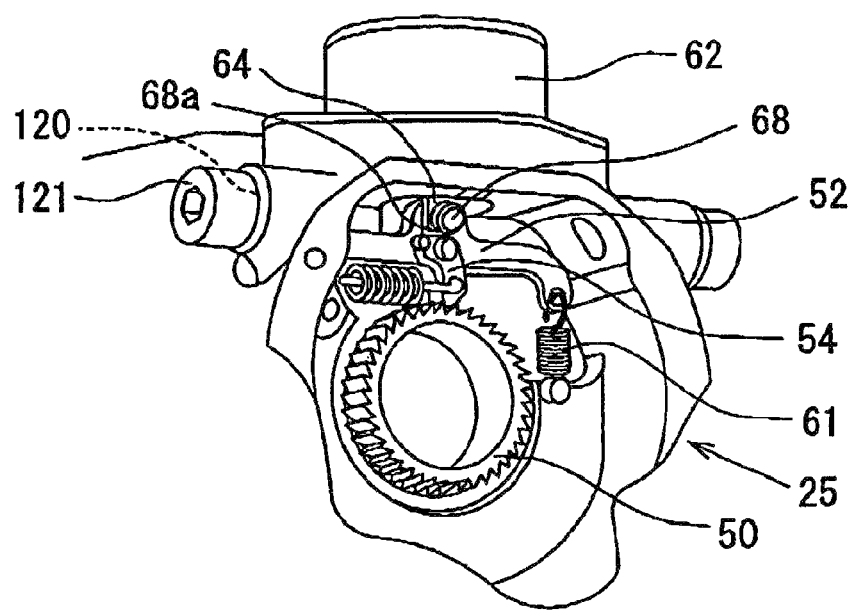
FIG. 3 is a perspective view schematically indicating the parking brake mechanism shown in FIG. 1.
Figure 4:
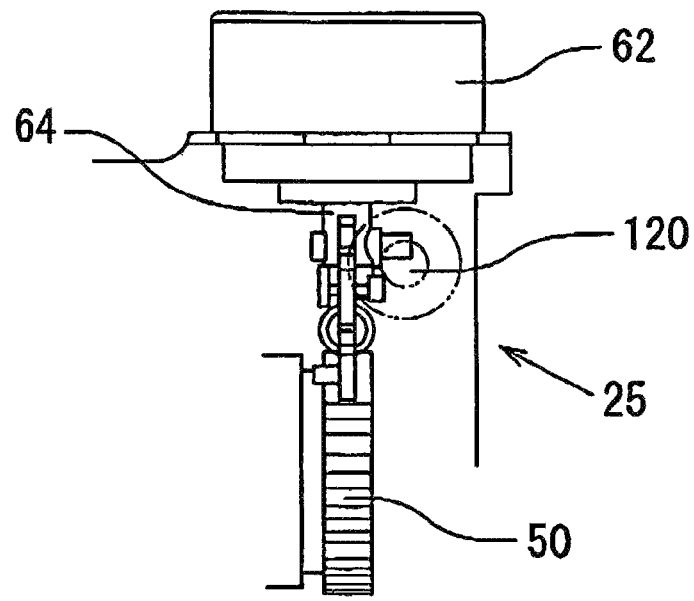
FIG. 4 is a side view schematically indicating the parking brake mechanism shown in FIG. 1.

As shown in FIGS. 1 and 2, the parking brake mechanism 25 comprises a ratchet 50 (an associated-movement portion) which is connected to the rotor 44 of the motor 21 and which operates in association with the motor 21, and a pivot arm 52 disposed at a periphery of the ratchet 50, with a basal end (no reference numeral therefor is indicated) of the pivot arm 52 being pivotably attached to the caliper body 10 using a pin 51. An outer peripheral portion of the ratchet 50 is integrally formed with a plurality of tooth portions 57. An associated-movement portion that operates in association with the motor is not limited to the ratchet 50. The associated-movement portion may be provided by forming a plurality of tooth portions 57 integral with an outer peripheral portion of the rotor 44 of the motor 21, if there is a sufficient space. Alternatively, the associated-movement portion may by formed by a movable component of the differential reduction mechanism 23 or the ball ramp mechanism (rotary-linear motion converting mechanism) 22 which operates in association with the motor. That is, the associated-movement portion can be formed by any component that is capable of forming a portion for engagement, such as a tooth portion.

An engaging pawl 54 is pivotably connected through a pin 53 to a substantially intermediate portion in a longitudinal direction of the pivot arm 52. A forward end portion (hereinafter referred to as "the engaging pawl forward end portion") 54a is engageable with the tooth portions 57. A flange (hereinafter referred to as "the pivot arm flange") 52a is formed at a substantially intermediate portion of the pivot arm 52. The pivot arm flange 52a extends in a direction orthogonal to the longitudinal direction of the pivot arm 52. The pivot arm flange 52a includes an oblong hole (hereinafter referred to as "the pivot arm flange oblong hole") 52b formed therein, which extends in the longitudinal direction of the pivot arm 52.

The parking brake mechanism 25 further comprises a fixed spring 58 which always biases the engaging pawl 54 in a leftward direction in FIG. 2, a projection 59 which is fixed to the pivot arm 52 and which cooperates with the fixed spring 58 to maintain the engaging pawl 54 in an upright position that enables engagement between the engaging pawl 54 and the ratchet 50, and an extension spring 61 which biases an end (a forward end; no reference numeral therefor is indicated) of the pivot arm 52 on a side opposite to the basal end thereof in a downward direction in FIG. 2.

Each tooth portion 57 of the ratchet 50 is substantially in an inverted V-shaped form comprising a tooth face 57a and a tooth face 57b. The tooth face 57a of the tooth portion 57 faces forward with respect to a direction R of rotation of the rotor 44 for releasing the brake (a clockwise direction in FIG. 2), and the tooth face 57b faces forward with respect to a direction L of rotation of the rotor 44 for applying the brake (a counter-clockwise direction in FIG. 2). In this case, the tooth face 57a is formed in a manner such that it extends substantially in a radial direction of the rotor 44, that is, a plane containing the tooth face 57a contains the center axis of the rotor 44 (the center axis C of the ratchet 50).

The actuator 60 comprises an actuator housing 62, a plunger supporting member 65, a permanent magnet 66 and a coil 67. The actuator housing 62 is substantially in a hat-like configuration and is fixed to the hole forming portion 13a of the motor case body 13 so as to cover the hole 15. The plunger supporting member 65 is mounted on the actuator housing 62, such that it is disposed at an opening (no reference numeral therefor is indicated) of a cavity 63 of the actuator housing 62. A plunger 64 is inserted through the plunger supporting member 65, and is movable in the axial direction of the plunger 64 (a vertical direction in FIG. 2) as a direction of displacement of the plunger 64. The permanent magnet 66 is disposed at the plunger supporting member 65 on a side of the cavity 63. The coil 67 is accommodated in the cavity 63. The permanent magnet 66 forms a self-holding type solenoid by exerting attraction on the plunger 64, thus suppressing a movement of the plunger 64 in a downward direction in FIG. 2.

The coil 67 is supplied with currents of different polarities, to thereby generate an electromagnetic force for the plunger 64 corresponding to the polarity of the current supplied. The coil 67 is capable of canceling an attractive force of the permanent magnet 66, to thereby enable the movement of the plunger 64 in the downward direction in FIG. 2 (and thus enable maintenance of application of the parking brake). The coil 67 is also capable of exerting attraction on the plunger 64 that has been moved in the downward direction in FIG. 2, due to the effect of the electromagnetic force generated, and thus enabling the movement of the plunger 64 in an upward direction in FIG. 2 (and thus enabling the release of the parking brake).

The plunger 64 is disposed in a state such that an axis thereof is directed toward the center axis C of the ratchet 50. A forward end portion (no reference numeral therefor is indicated) of the plunger 64 is connected to the pivot arm 52 through a pin 68 inserted through the pivot arm flange oblong hole 52b. When the plunger 64 moves in a vertical direction in FIG. 2, the pivot arm 52 is pivotally moved about the pin 51 according to the movement of the plunger 64, so as to effect engagement and disengagement between the engaging pawl 54 and the ratchet 50. In this embodiment, the pin 68, the pivot arm 52, the engaging pawl 54, the fixed spring 58 and the extension spring 61 provide the engaging structure.

A bolt hole 120 (an opening for insertion of a force-applying member for applying a force to a force-receiving portion) is formed at a left upper portion of the cylindrical motor case body 13 (housing) as viewed in FIG. 2. A watertight bolt 121 serving as a cap member is threadably engaged with the bolt hole 120. The bolt hole 120 is formed such that a line of extension of the center axis of the bolt hole 120 is substantially orthogonal to the direction of displacement of the plunger 64. The pin 68 is located on this line of extension. In this embodiment, a tool 122 (a force-applying member) is prepared. The tool 122 has a length sufficient to reach the pin 68 when the tool 122 is inserted through the bolt hole 120. The tool 122 comprises a rod-like tool body 123, a tool forward end portion 124 formed on one end of the tool body 123 and a grip portion 125 provided on the other end of the tool body 123. The tool forward end portion 124 forms an inclined portion that is substantially in the form of frustum.

Figure 5:
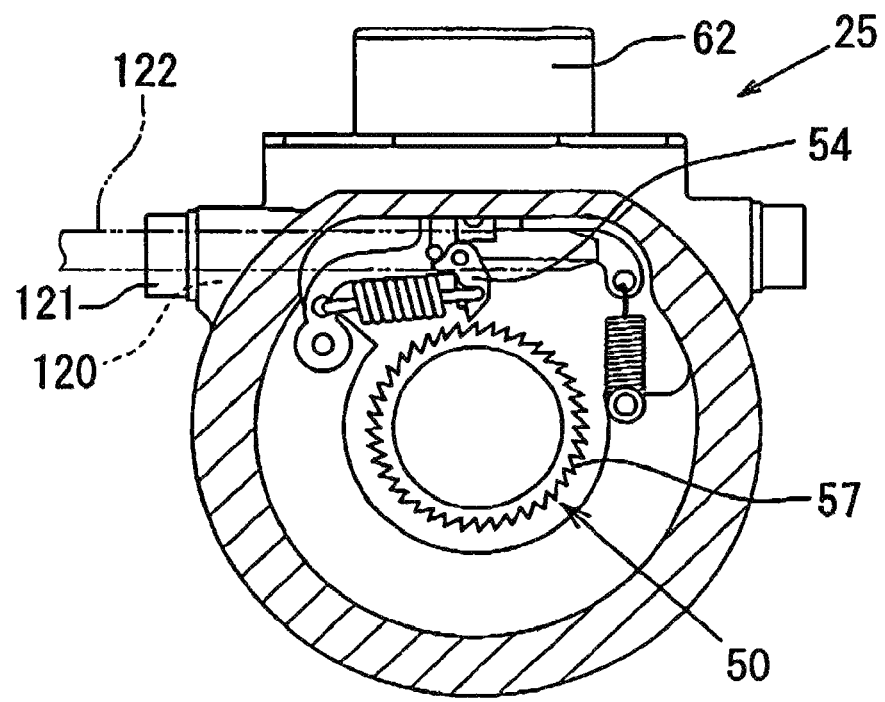
FIG. 5 is a cross-sectional view indicating how a tool shown in FIG. 2 is used.

To use the tool 122, the grip portion 125 of the tool 122 is held, and as indicated in FIG. 2, the tool 122 is inserted into the bolt hole 120 from which the watertight bolt 121 has been removed. The tool 122 is inserted until the tool forward end portion 124 reaches a lower surface 68a (a force-receiving portion) of the pin 68. When the tool forward end portion 124 reaches the lower surface 68a, the lower surface 68a, and hence the pin 68, receives an upward force (as viewed in FIG. 2) from the tool 122. By further inserting the tool 122 through the bolt hole 120, as indicated in FIG. 5, the pin 68 moves upwardly (as viewed in FIG. 2) along an inclined surface of the tool forward end portion 124. Accordingly, the pivot arm 52 pivotally moves about the pin 51 in a counter-clockwise direction in FIG. 2.

The coil 67 is connected through a cable 126 to the drive circuit 70 connected to the controller 40 and a battery 49. In this embodiment, by supplying a flow of a current in one direction to the coil 67, the coil 67 is caused to generate an electromagnetic force acting in a direction for canceling the attractive force of the permanent magnet 66 (a force which maintains an unlocked condition of the parking brake mechanism 25). This current flow in one direction is hereinafter referred to as "the first predetermined current". By supplying the coil 67 with the first predetermined current for a short period of time, the unlocked condition of the parking brake mechanism 25 is released. Thereafter, the parking brake mechanism 25 is placed in a locked condition due to the effect of a biasing force of the extension spring 61.

When the coil 67 is supplied with a flow of a current in a direction opposite to the direction of the first predetermined current (hereinafter referred to as "the second predetermined current"), the coil 67 generates an electromagnetic force acting against a pulling force of the extension spring 61, that is, an electromagnetic force acting in a direction for canceling a force for holding the plunger 64 (a force which maintains a locked condition of the parking brake mechanism 25). This electromagnetic force, or a total of this electromagnetic force and the attractive force of the permanent magnet 66, is set to be larger than the pulling force of the extension spring 61. The biasing force of the extension spring 61 is set to be smaller than a total of the attractive force of the permanent magnet 66 and the attractive force generated when the second predetermined current is supplied to the coil 67 for a short time period. By supplying the coil 67 with the second predetermined current, the locked condition of the parking brake mechanism 25 is released.

In the electric brake 1 in an initial state, the coil 67 is not energized, and the permanent magnet 66 exerts attraction on the plunger 64. In this state, the engaging pawl 54 is slightly spaced apart from the tooth portions 57 of the ratchet 50.

Hereinbelow, an operation of the electric brake 1 arranged as mentioned above is described. There are four modes of operation, namely, (1a) an operation for applying the normal brake, (1b) an operation for releasing the normal brake, (2a) an operation for applying the parking brake, (2b) an operation for releasing the parking brake and (3) an operation for manually releasing the parking brake.

(1a) Operation for Applying the Normal Brake:

For normal braking in which the electric brake is operated, the rotor 44 of the motor 21 is rotated in the counter-clockwise direction L in FIG. 2, according to a driver's force applied to the brake pedal. Consequently, the piston 20 thrusts (advances), thus generating a braking force corresponding to a torque of the motor 21.

During normal braking, the coil 67 is not energized, and the permanent magnet 66 exerts attraction on the plunger 64. Therefore, the engaging pawl 54 is positioned in a slightly spaced relationship to the tooth portions 57 of the ratchet 50. Therefore, the rotor 44 is smoothly rotated in the counter-clockwise direction L, and a normal braking function is satisfactorily exerted.

In this case, the rotor 44 is rotated, with the engaging pawl 54 being spaced apart from the tooth portions 57 of the ratchet 50. Therefore, generation of pronounced noise can be prevented and a wear rate can be decreased, so that the motor 21 can be operated with high efficiency.

(1b) Operation for Releasing the Normal Brake:

For releasing the normal brake, the rotor 44 of the motor 21 is rotated in the clockwise direction R in FIG. 2, according to the driver's operation for releasing the brake pedal. The piston 20 retracts, and thus the brake is released. In this instance, a non-energized condition of the coil 67 is maintained, so that the permanent magnet 66 exerts attraction on the plunger 64. Therefore, the engaging pawl 54 is held in a spaced relationship to the tooth portions 57 of the ratchet 50, and the ratchet 50 smoothly rotates with the rotor 44 in the clockwise direction R in FIG. 2, without making contact with the engaging pawl 54. Thus, releasing the normal brake can be ensured.

(2a) Operation for Applying the Parking Brake:

To apply the parking brake, the rotor 44 of the motor 21 is rotated in the counter-clockwise direction L in FIG. 2, according to the driver's operation for applying the parking brake. As in the case of normal braking, the piston 20 thrusts to thereby generate a braking force. Then, the first predetermined current is supplied to the coil 67 for a short period of time almost at the same time the braking force reaches a predetermined level. Thereafter, the motor 21 is deenergized.

Due to the supply of the first predetermined current to the coil 67 for a short period of time, the coil 67 generates an electromagnetic force which cancels the attractive force of the permanent magnet 66. Then, under the biasing force of the extension spring 61, the pivot arm 52 pivotally moves in the clockwise direction R in FIG. 2 while the plunger 64 moves in a downward direction in FIG. 2. Accordingly, the engaging pawl 54 is displaced towards the ratchet 50 and abuts against the tooth portion 57, and is maintained (locked) under force of the extension spring 61. In this embodiment, the locked condition of the parking brake mechanism 25 is maintained due to the effect of the biasing force of the extension spring 61.

When the motor 21 is deenergized, due to the effect of rigidity of the caliper 4 (such as retraction of the piston 20 under a reactive force generated by braking), a force of rotation in the clockwise direction R is generated in the rotor 44 of the motor 21. The engaging pawl 54 is pressed by this force of rotation, and the rotation of the rotor 44 in the clockwise direction R is restricted. As a result, the parking brake is secured.

In this embodiment, the first predetermined current is determined as a value of a current that enables the coil 67 to generate an electromagnetic force capable of canceling a magnetic force of the permanent magnet 66. Further, in this embodiment, the short period of time for which the first predetermined current is supplied is a time (100 msec-1 sec) between a point of time at which energization is started and a point of time at which the coil 67 generates an electromagnetic force that cancels the attractive force of the permanent magnet 66.

(2b) Operation for Releasing the Parking Brake:

To release the parking brake, the motor 21 is energized according to the driver's operation for releasing the parking brake, to thereby rotate the rotor 44 of the motor 21 slightly in the counter-clockwise direction L (a direction for braking). At the same time, the second predetermined current, which has a polarity opposite to that of the first predetermined current, is supplied from the drive circuit 70 to the coil 67 for a short period of time. Then, the force acting on the engaging pawl 54 due to the force of rotation of the rotor 44 is released, while the coil 67 excited by supplying the second predetermined current exerts attraction on the plunger 64 (causes a movement of the plunger 64 in an upward direction in FIG. 2). Consequently, the engaging pawl 54 is disengaged from the tooth portion 57. After a lapse of a certain period of time (the above-mentioned short period of time), the supply of the second predetermined current is stopped. After the deenergization, disengagement of the engaging pawl 54 from the tooth portion 57 (an unlocked condition of the parking brake mechanism 25) is maintained under the attractive force of the permanent magnet 66. In this embodiment, the unlocked condition of the parking brake mechanism 25 is maintained due to the effect of attractive force of the permanent magnet 66.

As has been described above, in this embodiment, a biasing force of the extension spring 61 is set to be smaller than a total of the attractive force generated by supplying the coil 67 with the second predetermined current for a short period of time and the attractive force of the permanent magnet 66. Therefore, by supplying the coil 67 with the second predetermined current for a short period of time, the engaging pawl 54 is disengaged from the tooth portion 57 of the ratchet 50.

Therefore, after the disengagement, when the rotor 44 of the motor 21 is rotated in the clockwise direction R (a direction for releasing the brake) with an appropriate timing, the ratchet 50 is smoothly rotated with the rotor 44 without making contact with the engaging pawl 54, to thereby release the parking brake.

(3) Operation for Manually Releasing the Parking Brake:

As has been explained in item (2b) above, the parking brake is normally released by supplying the coil 67 with the second predetermined current for a short period of time. However, when the parking brake mechanism 25 is operated [when the parking brake is applied (namely, the engaging pawl forward end portion 54a is engaged with the tooth portion 57)], if malfunctioning such as clogging of the plunger 64 occurs or if the supply of current to the coil 67 becomes impossible due to breaking of the coil 67 or the cable 126, an emergency action to release the parking brake can be conducted manually by using the tool 122.

That is, the watertight bolt 121 is detached from the bolt hole 120, and the grip portion 125 of the tool 122 is held to insert the tool 122 into the bolt hole 120. The tool 122 is inserted through the bolt hole 120 until the tool forward end portion 124 abuts against the lower surface 68a of the pin 68. By further inserting the tool 122 in the axial direction of the bolt hole 120, the pin 68 is pushed upwardly (as viewed in FIG. 2) by the sliding along the inclined portion of the tool forward end portion 124. Due to this upward movement of the pin 68, the pivot arm 52 pivotally moves about the pin 51 in the counter-clockwise direction in FIG. 2. Consequently, the engaging pawl 54 moves in an upward direction in FIG. 2, and the engaging pawl forward end portion 54a is separated from the tooth portion 57 for disengagement. This condition [the engaging pawl 54 being disengaged from the tooth portion 57 (the unlocked condition of the parking brake mechanism 25)] is maintained due to the attractive force of the permanent magnet 66 acting on the plunger 64.

As has been described above, in this embodiment, if the supply of current to the coil 67 becomes impossible when the parking brake is applied (when the engaging pawl forward end portion 54a is engaged with the tooth portion 57), an emergency action to release the parking brake can be manually conducted by using the tool 122.

This manual release of the parking brake using the tool 122 can be effected simply by inserting the tool 122 into the bolt hole 120 that is threadably engaged with the watertight bolt 121. Therefore, no cumbersome operation is necessary, and thus releasing the parking brake can be rapidly and easily conducted. Further, the manual release of the parking brake is enabled simply by forming the bolt hole 120 and preparing the watertight bolt 121 to be threadably engaged with the bolt hole 120 and the tool 122 to be inserted into the bolt hole 120. Therefore, no complicated structure is required.

In the first embodiment, as has been described above, the parking brake is released (unlocked) by supplying the coil 67 of the actuator 60 with the second predetermined current for a short period of time, to thereby separate the plunger 64 (and hence the engaging pawl 54) from the ratchet 50. Further, by supplying the coil 67 of the actuator 60 with the first predetermined current for a short period of time, the attractive force of the permanent magnet 66 acting on the plunger 64 is canceled, and the pivot arm 52 is pivotally moved in the clockwise direction in FIG. 2 under force of the extension spring 61, to thereby abut the engaging pawl 54 against the tooth portion 57 of the ratchet 50, thus maintaining (locking) the parking brake due to the effect of the biasing force of the extension spring 61. That is, in the first embodiment, while the extension spring 61 provides a biasing force that acts in a direction for abutment of the engaging pawl 54 against the ratchet 50 (a direction for locking), the actuator 60 provides a biasing force that acts in a direction for separation of the plunger 64 (and hence the engaging pawl 54) from the ratchet 50 (a direction for unlocking), due to the electromagnetic force generated by supplying the second predetermined current for a short period of time.

However, the relationship in the first embodiment between the force of the actuator 60 acting in the direction for unlocking (the force acting in a direction for separation of the engaging pawl 54 from the ratchet 50) and the force of the extension spring 61 acting in the direction for locking (the force acting in a direction for abutment of the engaging pawl 54 against the ratchet 50) may be reversed. That is, instead of the extension spring 61, a compression spring may be provided so as to apply a biasing force to the pivot arm 52 in an upward direction in FIG. 2. In this case, while the engaging pawl 54 is separated from the ratchet 50 due to the effect of the force of the compression spring, the engaging pawl 54 is abutted against the ratchet 50 due to the effect of the electromagnetic force of the actuator 60. To apply the parking brake, the coil 67 of the actuator 60 is supplied with the second predetermined current for a short period of time, to thereby abut the engaging pawl 54 against the ratchet 50. To release the parking brake, the coil 67 of the actuator 60 is supplied with the first predetermined current for a short period of time, to thereby cancel the attractive force of the permanent magnet 66 acting on the plunger 64. In this state, by operating the motor 21 in a direction for braking, the engagement between the engaging pawl 54 and the tooth portion 57 of the ratchet 50 is loosened, and the engaging pawl 54 is moved upward (as viewed in FIG. 2) by the compression spring and disengaged from the tooth portion 57 of the ratchet 50.

In this case also, the parking brake can be released manually by inserting the tool 122 into the bolt hole 120 that is threadably engaged with the watertight bolt 121.

Figure 6:
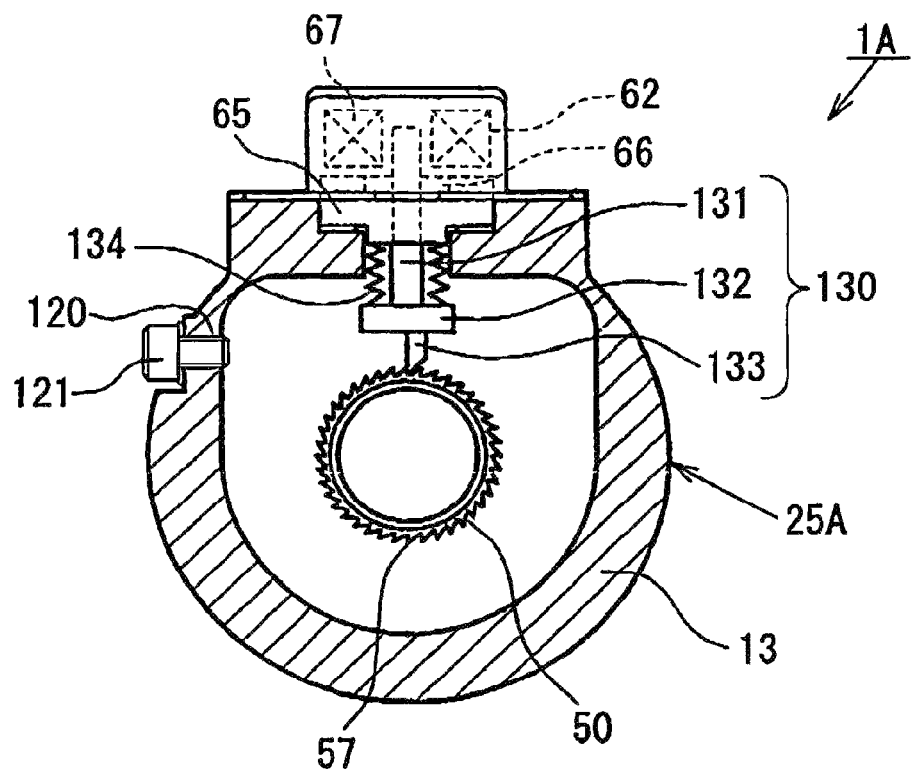
FIG. 6 is a cross-sectional view schematically showing a part of an electric brake according to a second embodiment of the present invention.
Figure 7:
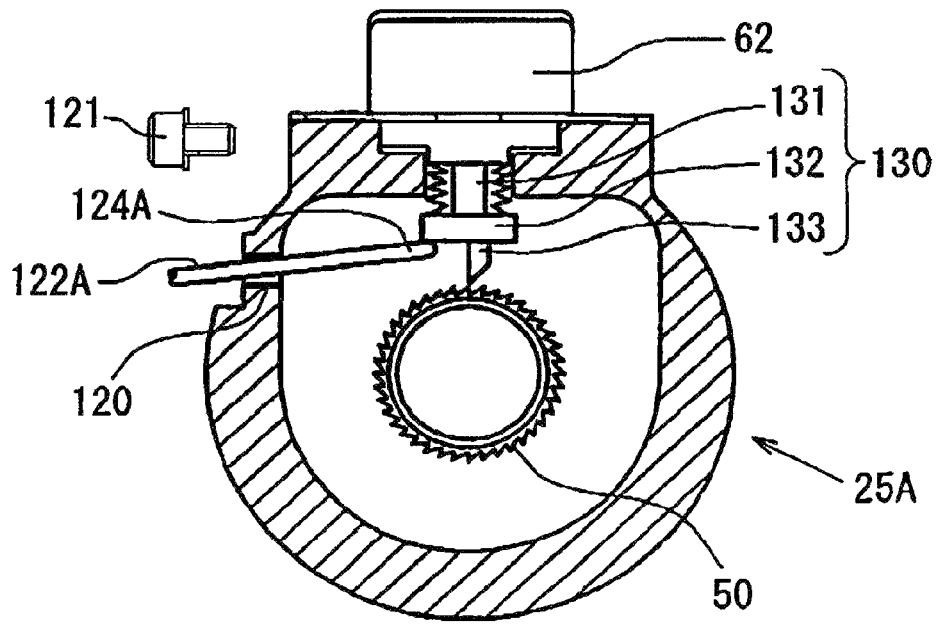
FIG. 7 is a cross-sectional view schematically indicating how a tool in the electric brake of FIG. 6 is used.

Next, referring to FIGS. 6 and 7, a second embodiment of the present invention is described. In an electric brake 1A in the second embodiment shown in FIGS. 6 and 7, differing from the electric brake 1 in the first embodiment, the engaging structure (the engaging pawl 54, the pivot arm 52, the pin 68, the fixed spring 58 and the extension spring 61) and the plunger 64 are eliminated, and a parking brake mechanism 25A is provided, which comprises an engaging plunger body 130 which functions as both the plunger 64 and the engaging pawl 54. The engaging plunger body 130 comprises a shaft-like plunger portion 131 made of a magnetic material, which is affected by an electromagnetic force of the coil 67, a manual release receiving portion 132 in a plate-like form, which is provided below the plunger portion 131 in FIG. 6, and an engaging pawl portion 133 extending downward from a surface of the manual release receiving portion 132 on a side opposite to the plunger portion 131. The engaging pawl portion 133 is engageable with the tooth portions 57 of the ratchet 50.

A spring member 134 is interposed between the plunger supporting member 65 and the manual release receiving portion 132. The spring member 134 is adapted to provide a biasing force which biases the manual release receiving portion 132 (and hence the engaging pawl portion 133) towards the tooth portions 57. The manual release receiving portion 132 is disposed such that when a tool 122A in the form of a rod, which is used instead of the tool 122, is inserted into the bolt hole 120 in an obliquely upward direction, a forward end portion 124A of the tool 122A abuts against a lower surface of the manual release receiving portion 132.

In the electric brake 1A in the second embodiment, when the parking brake mechanism 25A is operated [when the parking brake is applied (namely, the engaging pawl portion 133 of the engaging plunger body 130 is engaged with the tooth portion 57)], if the supply of current to the coil 67 becomes impossible due to breaking of the cable 126 (see FIG. 2) or the like, an emergency action to release the parking brake can be conducted manually by using the tool 122A.

That is, the tool 122A is inserted into the bolt hole 120 in the obliquely upward direction and the forward end portion 124A is abutted against the lower surface of the manual release receiving portion 132. In this state, when the other end portion of the tool 122A exposed to the outside is pivotally moved about the bolt hole 120 in a downward direction, the manual release receiving portion 132 (that is, the engaging plunger body 130) is moved in an upward direction in FIG. 7, by means of the forward end portion 124A. According to this movement of the engaging plunger body 130 (and hence the engaging pawl portion 133), the engaging pawl portion 133 of the engaging plunger body 130 is separated from the tooth portion 57. Thus, the engaging pawl portion 133 is disengaged from the tooth portion 57, and this condition [the engaging pawl portion 133 being disengaged from the tooth portion 57 (an unlocked condition of the parking brake mechanism 25A)] is maintained due to the attractive force of the permanent magnet 66 acting on the plunger portion 131 of the engaging plunger body 130.

The relationship in the second embodiment between the force of the actuator acting in a direction for unlocking (the force acting in a direction for separation of the engaging pawl portion 133 from the ratchet 50) and the force of the spring member 134 acting in a direction for locking (the force acting in a direction for abutment of the engaging pawl portion 133 against the ratchet 50) may be reversed. That is, instead of the spring member 134, an extension spring may be provided so as to provide a biasing force to the engaging pawl portion 133 in an upward direction in FIG. 6. In this case, while the engaging pawl portion 133 is separated from the ratchet 50 due to the effect of the force of the extension spring, the engaging pawl portion 133 is abutted against the ratchet 50, by means of the actuator. To apply the parking brake, the coil 67 of the actuator is supplied with the second predetermined current for a short period of time, to thereby abut the engaging pawl portion 133 against the ratchet 50. To release the parking brake, the coil 67 of the actuator is supplied with the first predetermined current for a short period of time, to thereby cancel the attractive force of the permanent magnet 66 acting on the engaging plunger body 130. In this state, by operating the motor 21 in a direction for braking, the engagement between the engaging pawl portion 133 and the tooth portion 57 of the ratchet 50 is loosened, and the engaging pawl portion 133 is moved upward (as viewed in FIG. 6) by the extension spring and disengaged from the tooth portion 57 of the ratchet 50.

In this case also, the parking brake can be released manually by inserting the tool 122A into the bolt hole 120 that is threadably engaged with the watertight bolt 121.

In the embodiments described below also, the direction of a biasing force of the actuator and the direction of a biasing force of the spring may be reversed. In this case also, the parking brake can be released manually using the tool.

Figure 8:
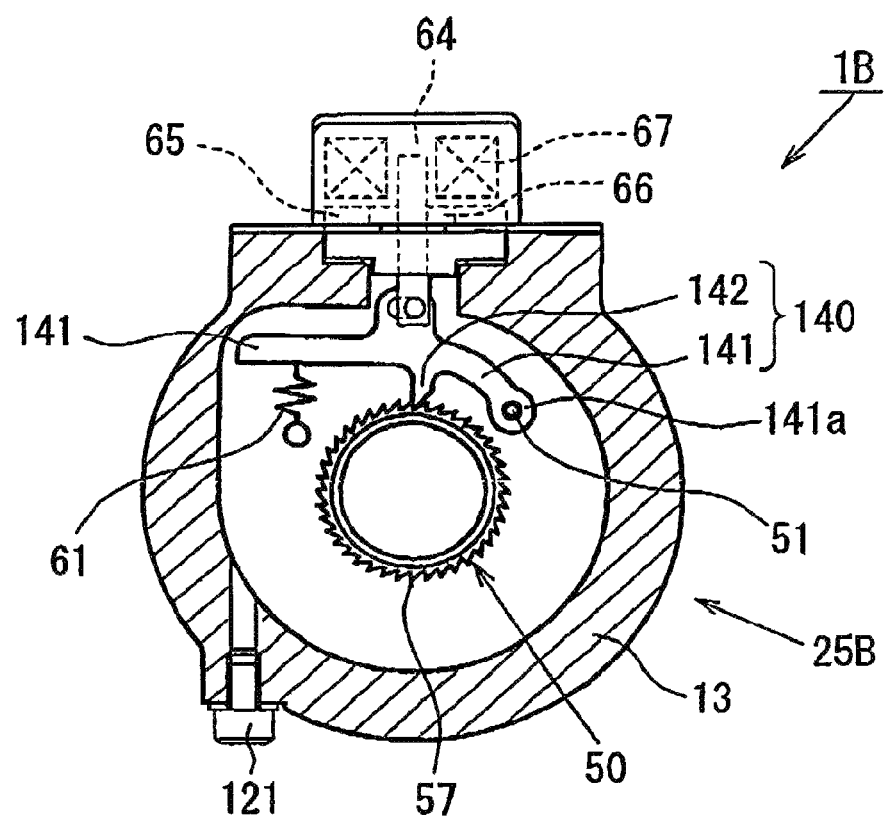
FIG. 8 is a cross-sectional view schematically showing a part of an electric brake according to a third embodiment of the present invention.
Figure 9:
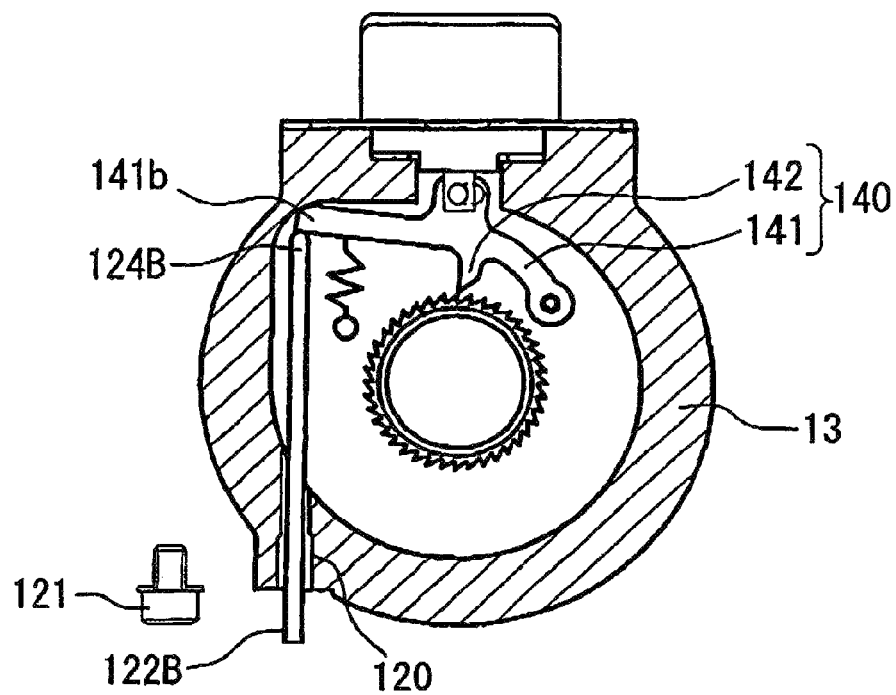
FIG. 9 is a cross-sectional view schematically indicating how a tool in the electric brake of FIG. 8 is used.

Next, a third embodiment of the present invention is described, referring to FIGS. 8 and 9. In an electric brake 1B in the third embodiment shown in FIGS. 8 and 9, differing from the electric brake 1 in the first embodiment, the engaging pawl 54, the pivot arm 52 and the fixed spring 58 are eliminated, and a parking brake mechanism 25B is provided, which comprises an engaging pivot arm body 140 which functions as both the engaging pawl 54 and the pivot arm 52. The engaging pivot arm body 140 comprises a pivot arm portion 141 having substantially the same configuration as the pivot arm 52, and also comprises an engaging pawl portion 142 projecting from a lower side of an almost central portion in a longitudinal direction of the pivot arm portion 141. The engaging pawl portion 142 is engageable with the tooth portions 57 of the ratchet 50. The engaging pivot arm body 140 is adapted to pivotally move about the pin 51. In the first embodiment, the pin 51 and the extension spring 61 are provided on the left side and the right side in FIG. 2, respectively. In the third embodiment, the pin 51 and the extension spring 61 are provided on the right side and the left side in FIG. 8, respectively. That is, a basal end portion 141a and a forward end portion 141b (a force-receiving portion) of the pivot arm portion 141 are located on the right side and the left side in FIG. 8, respectively.

In the third embodiment, the bolt hole 120 is formed so as to extend vertically at a left lower portion (in FIG. 8) of the motor case body 13. A direction of the axis of the bolt hole 120 is substantially the same as the direction of displacement of the plunger 64. The forward end portion 141b of the pivot arm portion 141 is located on the line of extension of the axis of the bolt hole 120. In the third embodiment, a tool 122B in the form of a rod is used, instead of the tool 122.

In the electric brake 1B in the third embodiment, when the parking brake mechanism 25B is operated [when the parking brake is applied (namely, the engaging pawl portion 142 of the engaging pivot arm body 140 is engaged with the tooth portion 57)], if the supply of current to the coil 67 becomes impossible due to breaking of the cable 126 (see FIG. 2) or the like, an emergency action to release the parking brake can be conducted manually by using the tool 122B.

That is, as indicated in FIG. 9, the tool 122B is inserted into the bolt hole 120 in an upward direction until a forward end portion (a tool forward end portion 124B) of the tool 122B abuts against the forward end portion 141b of the pivot arm portion 141. The tool 122B is further inserted in the axial direction of the bolt hole 120. Accordingly, the forward end portion 141b of the pivot arm portion 141 (and hence the engaging pivot arm body 140) is pushed in an upward direction in FIG. 9. According to this movement of the engaging pivot arm body 140 (and hence the engaging pawl portion 142), the engaging pawl portion 142 of the engaging pivot arm body 140 is separated from the tooth portion 57 for disengagement. This condition [the engaging pawl portion 142 being disengaged from the tooth portion 57 (the unlocked condition of the parking brake mechanism 25B)] is maintained due to the attractive force of the permanent magnet 66 acting on the plunger 64.

Figure 10:
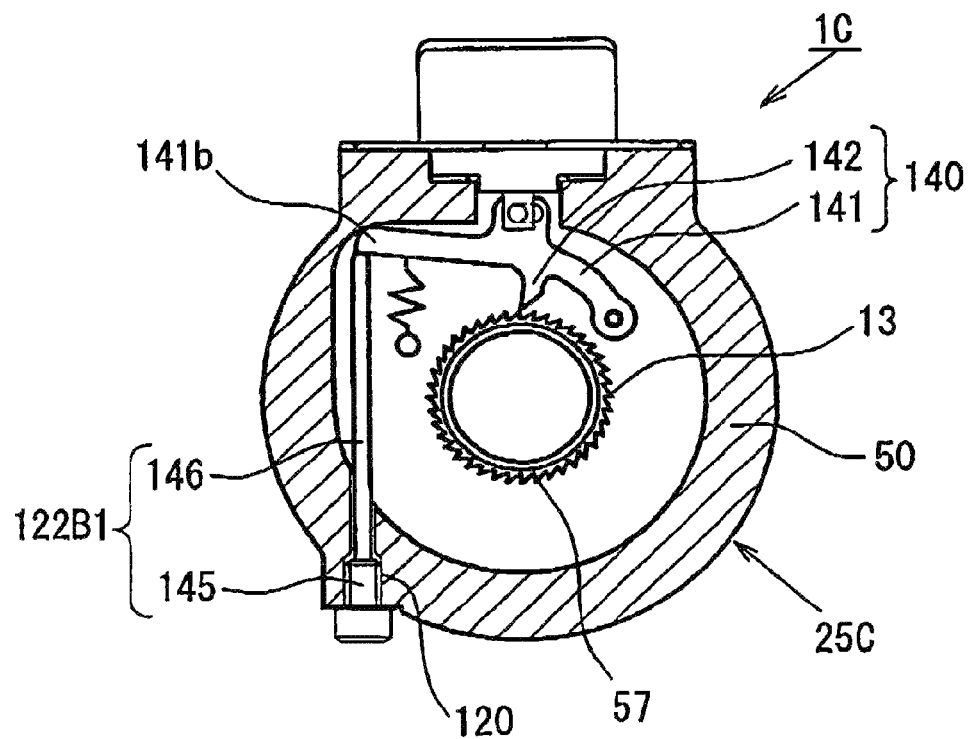
FIG. 10 is a cross-sectional view schematically showing a part of an electric brake according to a fourth embodiment of the present invention.

In the third embodiment, the tool 122B is in the form of a rod. However, in the present invention, there may be provided an electric brake 1C comprising a parking brake mechanism 25C including a tool 122B1 as shown in FIG. 10, instead of the tool 122B (fourth embodiment). The tool 122B1 comprises a bolt portion 145 threadably engaged with the bolt hole 120 and a rod portion 146 having substantially the same configuration as the tool 122B and connected to the bolt portion 145.

In the fourth embodiment, the tool 122B1 can be abutted against the forward end portion 141b of the pivot arm portion 141 simply by threading the tool 122B1 into the bolt hole 120 and moving the tool 122B1 towards the forward end portion 141b of the pivot arm portion 141. Therefore, differing from the third embodiment, the tool can be inserted in a stable condition, without the need for positional adjustment relative to the forward end portion 141b of the pivot arm portion 141.

Figure 11:
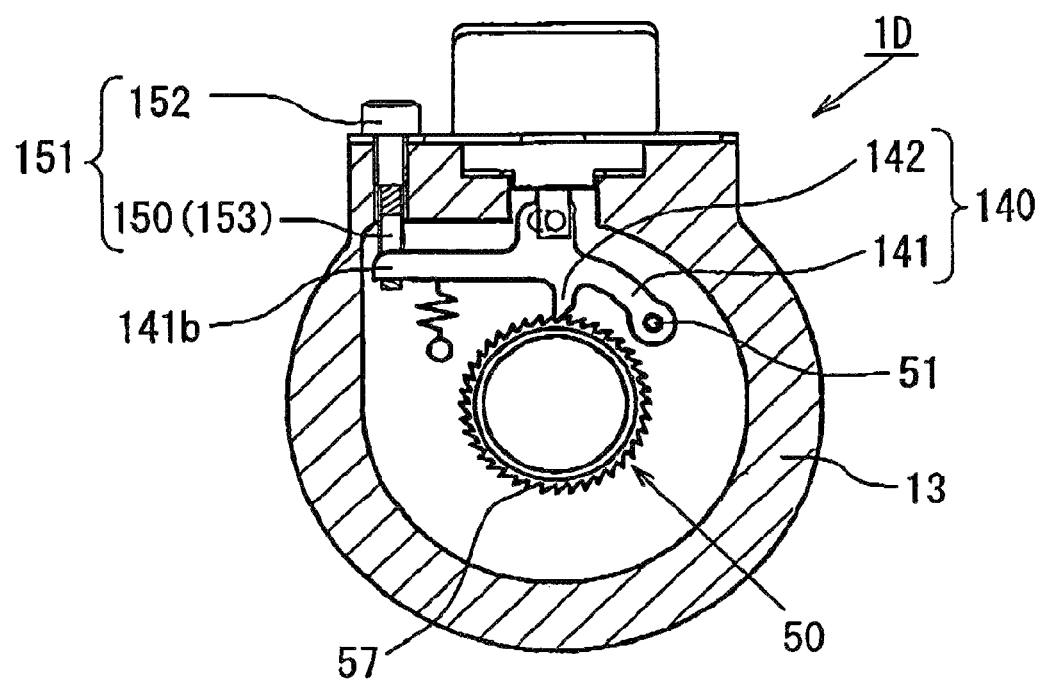
FIG. 11 is a cross-sectional view schematically showing a part of an electric brake according to a fifth embodiment of the present invention.
Figure 12:
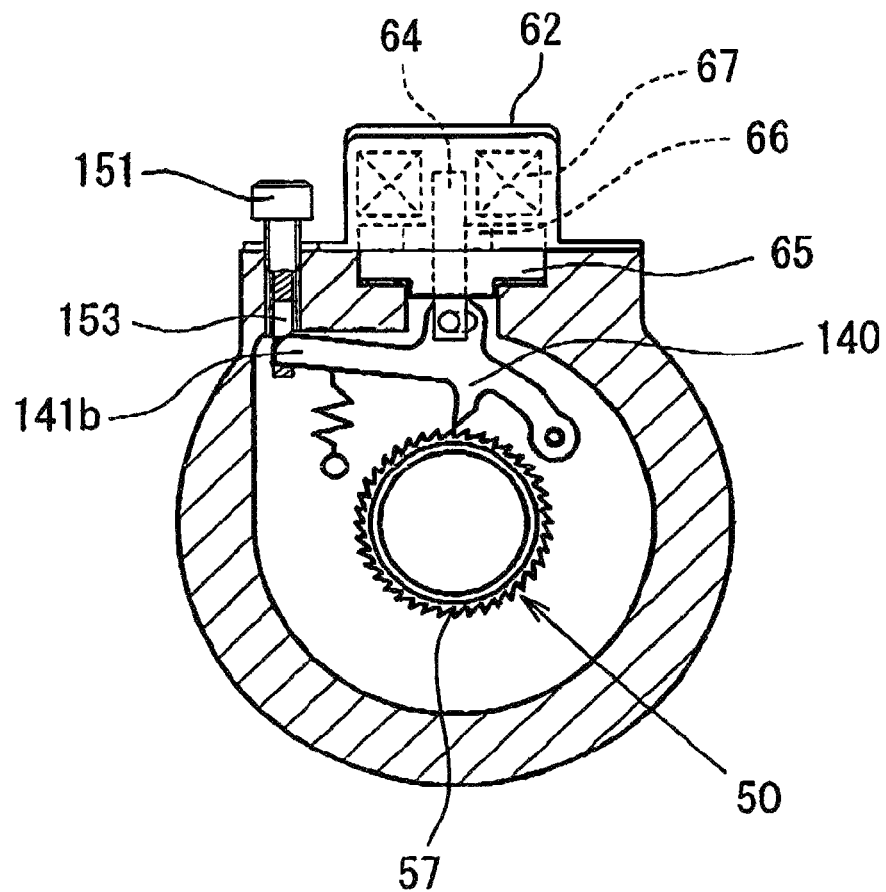
FIG. 12 is a cross-sectional view schematically indicating how a tool in the electric brake of FIG. 11 is used.
Figure 13:
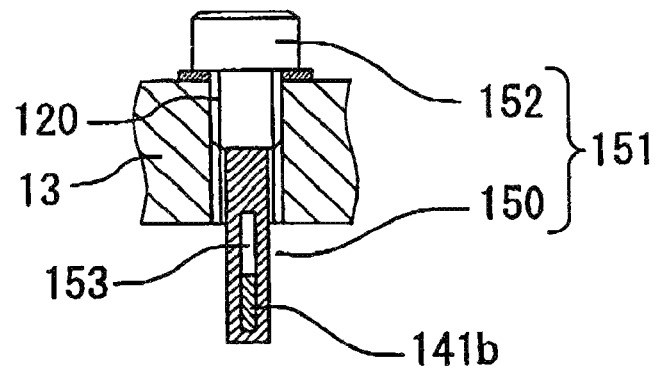
FIG. 13 is a cross-sectional view showing a movable piece-attached bolt shown in FIG. 11.

Next, referring to FIGS. 11 to 13, a fifth embodiment of the present invention is described. An electric brake 1D in the fifth embodiment shown in FIGS. 11 to 13 is different from the electric brake 1B in the third embodiment in that the bolt hole 120 extends vertically at a left upper portion of the motor case body 13 in FIG. 11 and a parking brake mechanism 25D is provided, which comprises a watertight bolt having a movable piece 150 attached thereto (hereinafter referred to as "the movable piece-attached bolt 151), instead of the watertight bolt 121 and the tool 122B. The term "movable piece" herein means a small piece which is movable with a body to which it is attached, and is rotatable relative to the body.

The movable piece-attached bolt 151 comprises a bolt body 152 threadably engaged with the bolt hole 120 and the movable piece 150 rotatably connected to an end portion (no reference numeral therefor is indicated) of a shaft portion of the bolt body 152. Normally, the movable piece-attached bolt 151 is inserted into the bolt hole 120, with the movable piece 150 being attached thereto.

The movable piece 150 includes a hole 153 for insertion of the forward end portion 141b of the pivot arm portion 141, and is used in a condition such that the forward end portion 141b of the pivot arm portion 141 extends through the hole 153. To ensure free pivotal movement of the pivot arm portion 141, a size of the hole 153 exceeds an amount of movement of the forward end portion 141b.

In the electric brake 1D in the fifth embodiment, when the parking brake mechanism 25D is operated [when the parking brake is applied (namely, the engaging pawl portion 142 of the engaging pivot arm body 140 is engaged with the tooth portion 57)], if the supply of current to the coil 67 becomes impossible due to breaking of the cable 126 (see FIG. 2) or the like, an emergency action to release the parking brake can be conducted manually by using the movable piece-attached bolt 151.

That is, the movable piece-attached bolt 151 is rotated in a direction for separation from the bolt hole 120. Then, due to an upward movement of the movable piece 150, the forward end portion 141b of the pivot arm portion 141, which is disposed in the hole 153 of the movable piece 150, moves upward. According to the movement of the engaging pivot arm body 140 (and hence the engaging pawl portion 142) in an upward direction in FIG. 11, the engaging pawl portion 142 of the engaging pivot arm body 140 is separated from the tooth portion 57 for disengagement.

In the present invention, an electric brake 1E comprising a parking brake mechanism 25E including a tool 122E, instead of the movable piece-attached bolt 151 in the fifth embodiment, may be provided (sixth embodiment). The tool 122E is preliminarily attached to the bolt hole 120.

The tool 122E comprises the movable piece 150 and a wire 160 connected to the movable piece 150. In this embodiment, a seal member 161 including a hole (no reference numeral therefor is indicated) for insertion of the wire 160 is provided, so as to prevent entry of water or the like.

In the electric brake 1E in the sixth embodiment, when the parking brake mechanism 25E is operated [when the parking brake is applied (namely, the engaging pawl portion 142 of the engaging pivot arm body 140 is engaged with the tooth portion 57)], if the supply of current to the coil 67 becomes impossible due to breaking of the cable 126 (see FIG. 2) or the like, an emergency action to release the parking brake can be conducted manually by using the tool 122E.

Figure 14:
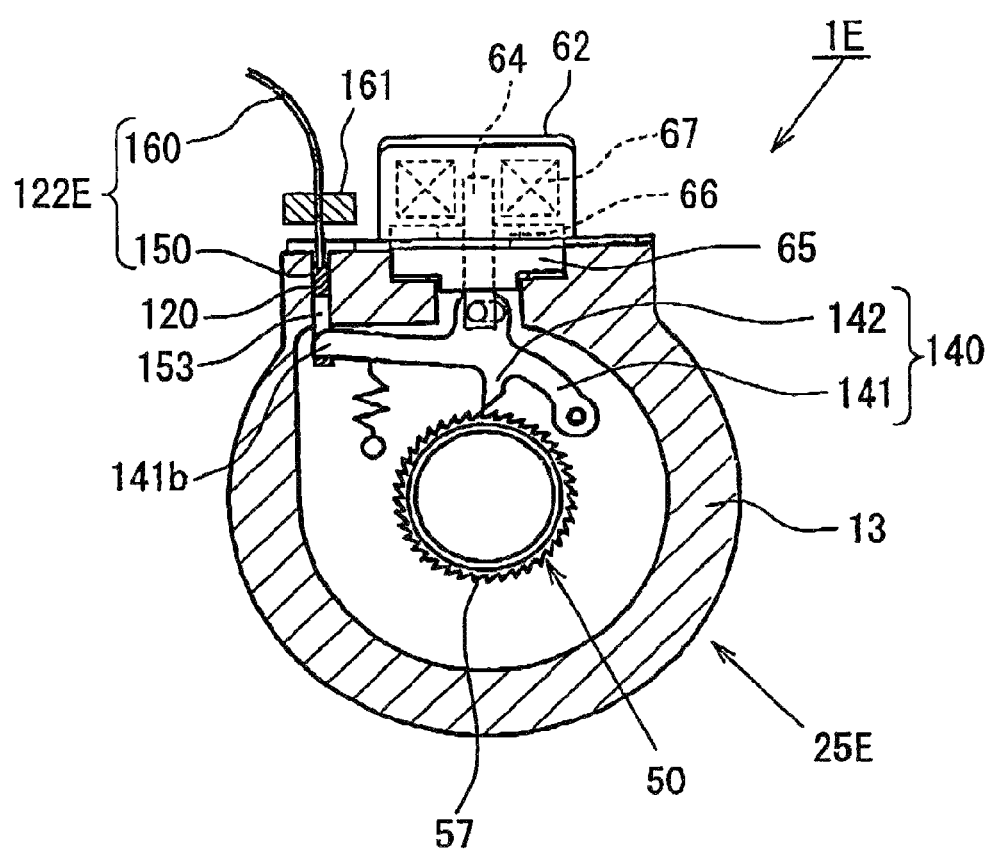
FIG. 14 is a cross-sectional view schematically showing a part of an electric brake according to a sixth embodiment of the present invention.

That is, the wire 160 is pulled to thereby move the movable piece 150 in an upward direction. Due to the upward movement of the movable piece 150, the forward end portion 141b of the pivot arm portion 141 which has been inserted into the hole 153 of the movable piece 150 moves upward. According to the movement of the engaging pivot arm body 140 (and hence the engaging pawl portion 142) in an upward direction in FIG. 14, the engaging pawl portion 142 of the engaging pivot arm body 140 is separated from the tooth portion 57 for disengagement (FIG. 14 indicates a disengaged condition).

Figure 15:
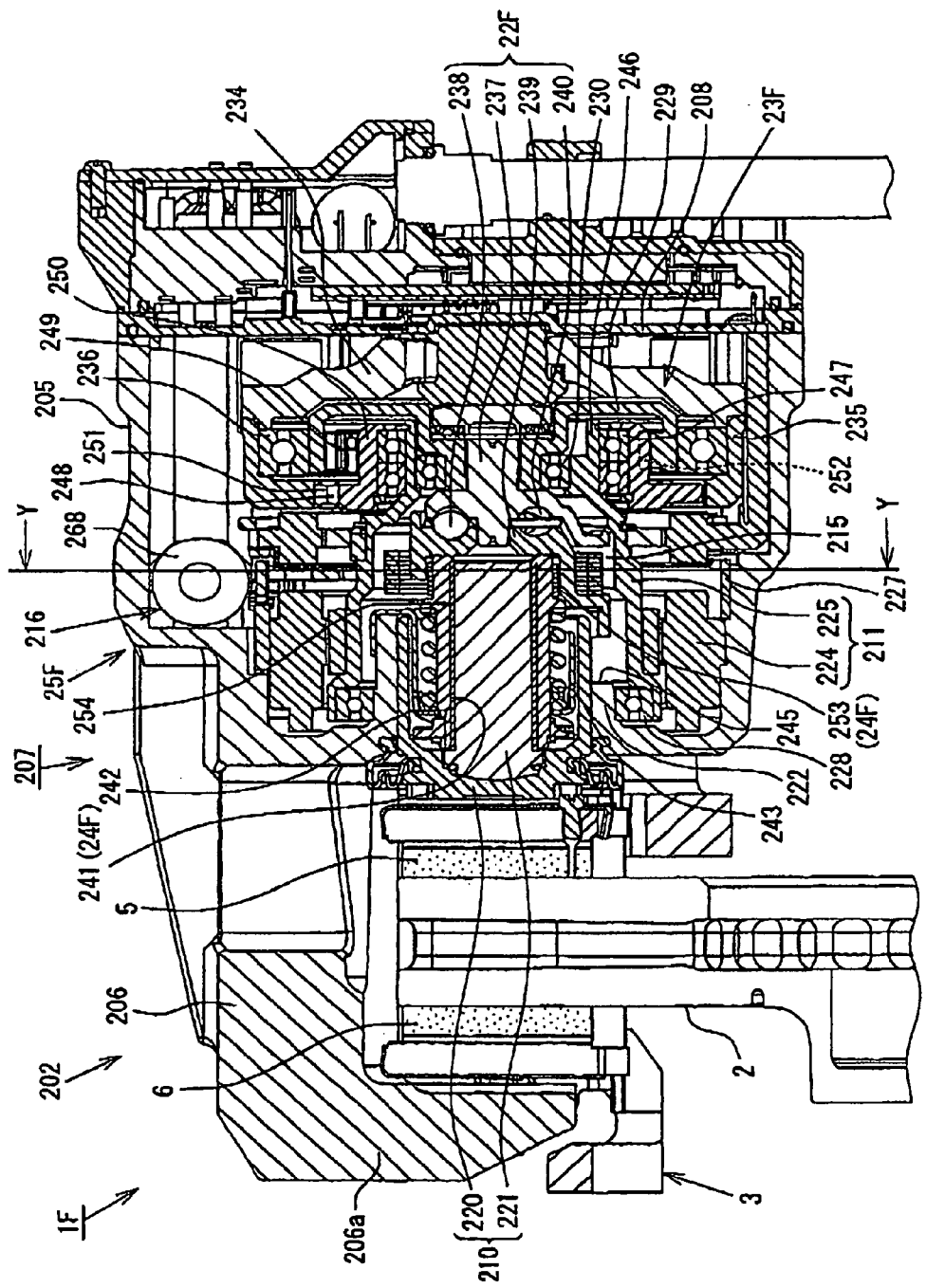
FIG. 15 is a cross-sectional view schematically showing an electric brake according to a seventh embodiment of the present invention.
Figure 16:
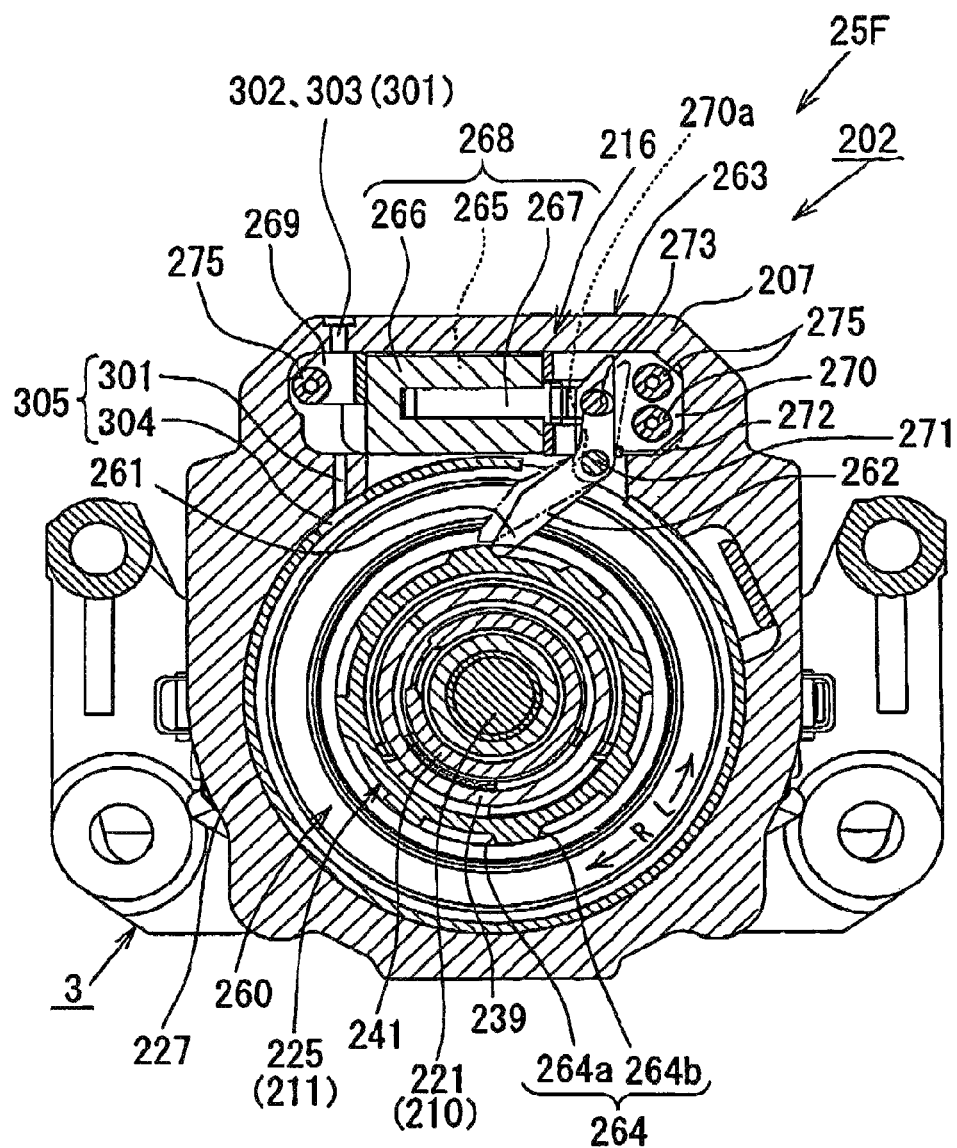
FIG. 16 is a cross-sectional view, taken along the line Y-Y in FIG. 15.
Figure 17:
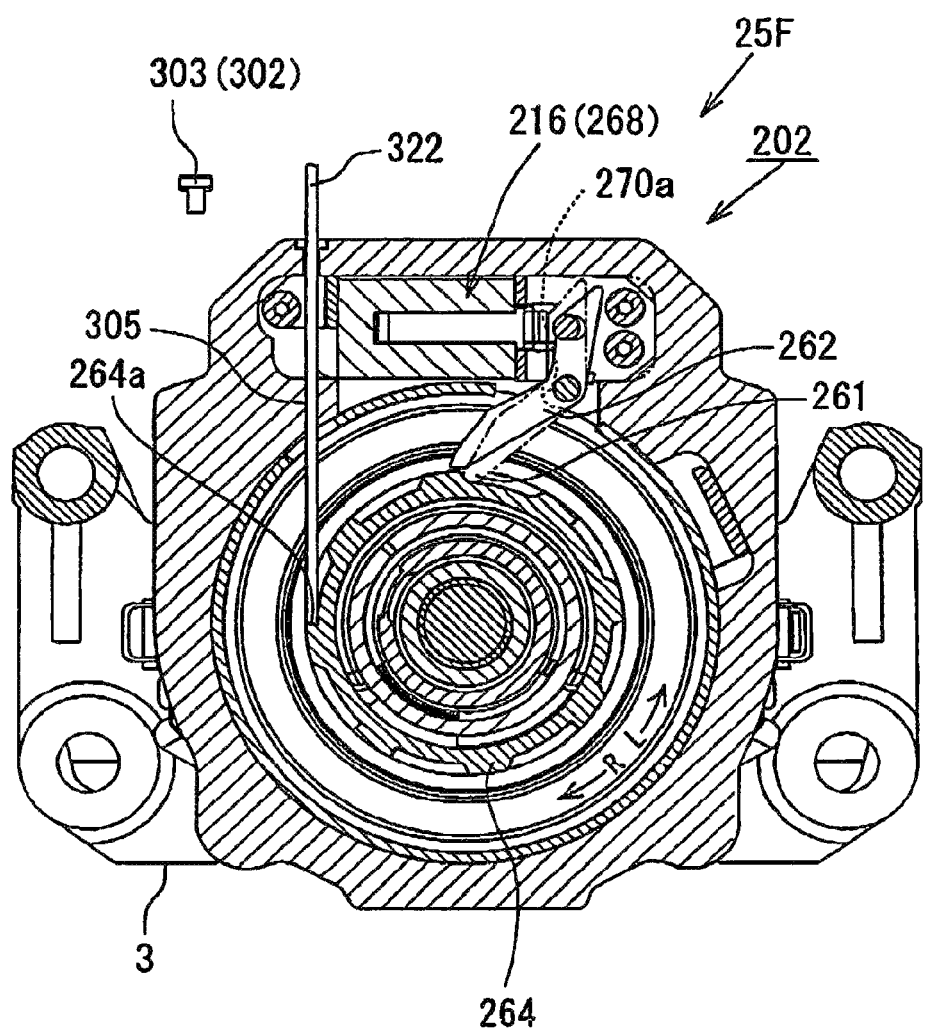
FIG. 17 is a cross-sectional view, corresponding to FIG. 16, indicating how a tool is used.

Next, referring to FIGS. 15 to 17, an electric brake according to a seventh embodiment is described. An electric brake 1F according to the seventh embodiment is different from the above-mentioned embodiments in that the force-receiving portion is provided in a ratchet 260 (an associated-movement portion), not the plunger or the engaging structure. Further, differing from the first embodiment in which the extension spring 61 acting on the pivot arm 52 applies a force in a direction for abutment of the engaging pawl 54 against the tooth portion 57 of the ratchet 50, in the seventh embodiment a torsion spring 272 acting on a pivot arm 262 applies a force in a direction for disengagement of an engaging pawl 261 from tooth portions 264 of the ratchet 260. When the engaging pawl 261 is disengaged from the ratchet 260, the disengagement is maintained due to the effect of force of the torsion spring 272.

In the following explanation, the same or corresponding portions as those in the first to sixth embodiments are designated by the same reference numerals as used in these embodiments, and overlapping explanation thereof is omitted.

In FIGS. 15 to 17, reference numeral 202 indicates a caliper supported by the carrier 3. The caliper 202 is capable of a floating movement in the axial direction of the disc rotor 2. The brake pads 5 and 6 are also supported by the carrier 3 so as to be capable of moving in the axial direction of the disc rotor 2. The caliper 202 comprises a caliper body 207 including a casing portion 205 and a caliper claw 206 extending from the casing portion 205 over the disc rotor 2 to the outer side of the vehicle body. A claw piece 206a of the caliper claw 206 is disposed in proximity to the rear surface of the brake pad 6 located on the outer side of the vehicle body. An inner surface of the casing portion 205 has a stepped configuration. An open end formed in a rear portion of the casing portion 205 is covered with a cover plate 208.

In the casing portion 205 of the caliper body 207, there are provided a piston 210 capable of abutting against the rear surface of the brake pad 5 on the inner side of the vehicle body, a motor 211, a ball ramp mechanism 22F (a rotary-linear motion converting mechanism) for enabling rotation of the motor 211 to be converted to a linear motion and transmitted to the piston 210, a reduction mechanism 23F for enabling rotation of the motor 211 to be reduced and transmitted to the ball ramp mechanism 22F, a pad wear compensation mechanism 24F for changing a position of the piston 210 according to an amount of wear of the brake pads 5 and 6 to thereby compensate for the amount of wear, a parking brake mechanism 25F for securing the parking brake and a coil spring 215. When the motor 211 malfunctions during braking, the piston 210 is automatically returned to an initial position by means of the coil spring 215, and thus the brake is released (that is, the coil spring 215 functions as a brake releasing mechanism).

The piston 210 comprises a cup-like body portion 220 and a small-diameter shaft portion 221 connected to the cup-like body portion 220. The cup-like body portion 220 is slidably fitted into a cylinder portion 222 formed in the caliper body 207, with a seal member (no reference numeral therefor is indicated) being provided therebetween. The motor 211 comprises a stator 224 fixed in a fitted relationship to the casing portion 205 of the caliper body 207 and a rotor 225 having a hollow structure disposed in the stator 224.

The stator 224 is securely pressed against a stepped portion of the inner surface of the casing portion 205 by means of a support cylinder 227 which is fitted into the casing portion 205 through the open end formed at the rear portion of the casing portion. The rotor 225 has one end thereof supported by the cylinder portion 222 of the caliper body 207 through a bearing 228 and the other end thereof supported by a rotatable body 229 (described later) through a bearing 230.

The motor 211 is adapted to rotate the rotor 225 through a desired angle with a desired torque, in response to a command signal from a controller (not shown). In the casing portion 205, there are provided a ring-like support plate 234 and a toothed wheel member 235 (described later) as a unit at a position adjacent to the cover plate 208. A bearing 236 for supporting the rotatable body 229 is held between the support plate 234 and the toothed wheel member 235.

The ball ramp mechanism 22F comprises a first disc 237 and a second disc 239 (a linearly movable member). The first disc 237 is connected to an axial opening of the rotatable body 229 using a spline. The second disc 239 is in contact with the first disc 237 through a plurality of balls 238. Each of the surfaces of the first disc 237 and the second disc 239 facing each other includes three ball grooves 240, each extending in an arc form in a circumferential direction of the discs. The balls 238 are interposed between these ball grooves 240. The second disc 239 is loosely fitted over a cylindrical adjuster 241 (described later) forming the pad wear compensation mechanism 24F. A return spring 243 (a coil spring) is interposed between the adjuster 241 and a spring-receiving portion 242 mounted on the cylinder portion 222 of the caliper body 207. The second disc 239 is normally pressed towards the first disc 237 under a biasing force of the return spring 243 transmitted through the adjuster 241.

Rotation of the second disc 239 in a counter-clockwise direction as viewed from the right side in FIG. 15 (this direction is hereinafter referred to as "the normal direction") is limited. Therefore, when the first disc 237 rotates in the counter-clockwise direction in a state such that the second disc 239 is positioned at an original position, the balls 238 roll along the inclined surfaces of the bottoms of the ball grooves 240, to thereby cause a linear movement of the second disc 239 relative to the disc rotor 2.

The reduction mechanism 23F comprises an eccentric shaft 246 integral with the rotor 225, and an eccentric wheel 250 pivotably fitted around the eccentric shaft 246 through a bearing 247. A first toothed wheel 248 and a second toothed wheel 249 (externally toothed wheels) are formed at an outer peripheral portion of the eccentric wheel 250. The reduction mechanism 23F also comprises a fixed toothed wheel 251 (an internally toothed wheel) and a movable toothed wheel 252 (an internally toothed wheel). The fixed toothed wheel 251 is formed in an inner circumferential surface of the toothed wheel member 235 for supporting the rotatable body 229, and is adapted to engage the first toothed wheel 248 of the eccentric wheel 250. The movable toothed wheel 252 is formed in the rotatable body 229 so as to engage the second toothed wheel 249. The eccentric wheel 250 performs an orbiting motion according to rotation of the eccentric shaft 246 (the rotor 225) while being engaged with part of the teeth of the fixed toothed wheel 251 and the movable toothed wheel 252. In this instance, since the number of teeth of the fixed toothed wheel 251 and the number of teeth of the movable toothed wheel 252 are different, the first disc 237 rotates with a predetermined rotational speed ratio (a reduction ratio) relative to the rotor 225.

The pad wear compensation mechanism 24F comprises the cylindrical adjuster 241, and a one-way clutch 253 interposed between the adjuster 241 and the second disc 239 of the ball ramp mechanism 22F. The adjuster 241 is operatively connected to the piston 210 through a thread portion 254 comprising internal threads formed in an inner surface of the adjuster 241 and external threads formed in an outer circumferential surface of the shaft portion 221 of the piston 210.

In this embodiment, the one-way clutch 253 comprises a coil spring. The one-way clutch 253 allows the adjuster 241 to follow the rotation of the second disc 239 of the ball ramp mechanism 22F in the normal direction. The one-way clutch 253 makes the adjuster 241 slip relative to the rotation of the second disc 239 in the reverse direction.

During normal braking (an operation of the electric brake), since the second disc 239 is maintained at the original position at which the second disc 239 abuts against a side portion (a groove side wall) of a groove 245 of the cylinder portion 222, the adjuster 241 and the one-way clutch 253 of the pad wear compensation mechanism 24F, together with the second disc 239, linearly move as a unit relative to the disc rotor 2, and the piston 210 follows this movement. On the other hand, when the second disc 239 rotates in the reverse direction from the original position, the adjuster 241 does not rotate and remains at the same position. Thereafter, when the second disc 239 rotates in the normal direction, the adjuster 241 rotates to follow the rotation of the second disc 239. When the adjuster 241 rotates, the piston 210, which is operatively connected to the adjuster 241 through the thread portion 254, moves in a forward direction, and thus displacement of the piston 210 relative to the second disc 239 occurs. As a result, compensation of an amount of wear of the brake pads can be achieved.

Normally, a predetermined pad clearance is formed between the piston 210 and the brake pad 5. As a result of the forward movement of the piston 210, first, this pad clearance is cancelled, and then the brake pad 5 is pressed against the disc rotor 2. In this instance, a reactive force acts to move the caliper 202 relative to the carrier 3 (in a rightward direction in FIG. 15), with the result that the disc rotor 2 is held between the brake pads 5 and 6. Thus, braking is started, and a thrusting force corresponding to the braking is generated in the piston 210.

The coil spring 215 is provided between the first disc 237 and the second disc 239 forming the ball ramp mechanism 22F. The coil spring 215 is interposed between the first disc 237 and the second disc 239 so as to generate a predetermined preload, so that the second disc 239 is normally maintained at the original position at which the second disc 239 abuts against the groove side wall of the cylinder portion 222 of the caliper body 207. In this state, when the first disc 237 rotates in a direction for braking (a direction for a thrust movement of the piston), since the position of the second disc 239 is fixed, a torque is accumulated in the coil spring 215. If the motor 211 malfunctions during braking, the first disc 237 is returned to the initial position due to the effect of the torque accumulated in the coil spring 215.

As shown in FIGS. 16 and 17, the parking brake mechanism 25F comprises the ratchet 260 integral with an outer circumferential surface of the rotor 225 of the motor 211, and a drive unit 263 including the pivot arm 262 having the engaging pawl 261 formed at a forward end thereof so as to be engageable/disengageable with the ratchet 260. Each tooth portion 264 of the ratchet 260 is configured, such that a tooth face 264a (a force-receiving portion) faces forward with respect to a direction R of rotation of the rotor 225 for releasing the brake, and an inclined flank surface 264b faces forward with respect to a direction L of rotation of the rotor 225 for applying the brake.

The drive unit 263 comprises a solenoid 268 and brackets 269 and 270. The solenoid 268 comprises a plunger 267 slidably accommodated in a housing 266 having a built-in coil 265. The brackets 269 and 270 are fixedly connected to opposite ends of the solenoid 268. A pair of supporting pieces 270a are formed so as to project from one bracket 270 having a hollow structure, and an intermediate portion (a bent portion) of the pivot arm 262 is pivotably connected to the pair of supporting pieces 270a using a pin 271. The drive unit 263 also comprises the torsion spring 272 wound around the pin 271 as a pivotal axis of the pivot arm 262 and adapted to bias the pivot arm 262 in a clockwise direction in FIG. 16, and a connecting pin 273 attached to the bracket 270 to provide operative connection between a basal end portion of the pivot arm 262 and a forward end portion of the plunger 267.

Under force of the torsion spring 272, the pivot arm 262 is normally biased in a direction for disengagement of the engaging pawl 261 from the ratchet 260. The solenoid 268 is formed as an attractive type solenoid which attracts the plunger 267 when the coil 265 is energized. Therefore, according to the energization of the coil 265 of the solenoid 268, the pivot arm 262 pivotally moves in a direction for engaging the engaging pawl 261 with the ratchet 260. The energization of the coil 265 of the solenoid 268 is controlled by a drive circuit (not shown) connected to the controller (not shown).

The engaging pawl 261, the pivot arm 262, the solenoid 268, the brackets 269 and 270 forming the drive unit 263 are preliminarily formed into a unit as a subassembly. The drive unit 263 is detachably connected to the caliper body 207 by means of bolts 275 extended through the brackets 269 and 270.

A guide hole 301 in the caliper is formed in the vicinity of a portion of the caliper body 207 at which the bracket 269 is disposed (a left upper position in FIG. 16), while avoiding interference with the bracket 269. A watertight bolt 303, together with a packing 302, is threadably engaged with the guide hole 301 in the caliper.

A support cylinder guide hole 304 is formed at a portion of the support cylinder 227 facing an open end of the caliper guide hole 301 on a lower side thereof (as viewed in FIG. 16). In this embodiment, the caliper guide hole 301 and the support cylinder guide hole 304 (the caliper guide hole 301 and the support cylinder guide hole 304 in combination are hereinafter, frequently referred to as "the guide hole 305") form an opening for insertion of a force-applying member for applying a force to a force-receiving portion. The caliper body 207 and the support cylinder 227 form a housing accommodating the parking brake mechanism.

The guide hole 305 is formed such that an outer peripheral portion of the ratchet 260 exists on a line of extension of the axis of the guide hole 305. In this embodiment, a tool 322 (a force-applying member) is prepared, which is adapted to be inserted through the guide hole 305 and has a length sufficient to reach the outer peripheral portion of the ratchet 260. The tool 322 is inserted into the guide hole 305 until the forward end portion thereof abuts against the tooth face 264a (the force-receiving portion) of the ratchet 260. By pressing the tool 322, a force is applied to the tooth face 264a to rotate the ratchet 260 in the direction L for braking.

Hereinbelow, an operation of the electric brake 1F arranged as mentioned above is described. There are six modes of operation, namely, (F1a) an operation for applying the normal brake, (F1b) an operation for releasing the normal brake, (F2) an operation when brake pads become worn, (F3) an operation in the event of malfunctioning of a motor (F4a) an operation for applying the parking brake, (F4b) an operation for releasing the parking brake and (F5) an operation for manually releasing the parking brake.

(F1a) Operation for Applying the Normal Brake:

When the electric brake is operated for normal braking, the rotor 225 of the motor 211 is rotated in the counter-clockwise direction in FIG. 16, in response to a signal indicative of a driver's operation of a brake pedal. Consequently, the eccentric wheel 250, which is attached through the bearing 247 to the eccentric shaft 246 integral with the rotor 225, performs an orbiting motion, and the first disc (pivotal member) 237 of the ball ramp mechanism 22F rotates in the counter-clockwise direction with a predetermined rotational speed ratio relative to the rotor 225. Then, the balls 238 of the ball ramp mechanism 22F roll between the ball grooves 240, to thereby advance the second disc (linearly movable member) 239. This movement of the second disc 239 is transmitted to the piston 210 through the adjuster 241 of the pad wear compensation mechanism 24F. When no wear on the brake pads exists, the piston 210 thrusts from its original position through a position at which no pad clearance is formed, and a braking force corresponding to the torque of the motor 211 is generated. Meanwhile, a torque is accumulated in the coil spring 215 as the brake releasing mechanism.

During normal braking, the solenoid 268 of the parking brake mechanism 25F is not energized, and the pivot arm 262 is biased pivotally about its pivot axis (the pin 271) in the clockwise direction in FIG. 16. Therefore, the engaging pawl 261 at the forward end of the pivot arm 262 is positioned in a slightly spaced relationship to the tooth portions of the ratchet 260 on the rotor 225 of the motor 211. Consequently, the rotor 225 smoothly rotates in the direction L for braking, and a normal braking function is satisfactorily exerted.

(F1b) Operation for Releasing the Normal Brake:

For releasing the electric brake, the rotor 225 of the motor 211 is rotated in the clockwise direction in FIG. 16, according to the driver's operation for releasing the brake pedal. As a result, the balls 238 of the ball ramp mechanism 22F return to their original positions in the ball grooves 240. In this instance, the biasing force of the return spring 243 acts on the second disc 239. Therefore, the second disc 239 and the adjuster 241 of the pad wear compensation mechanism 24F return as a unit, thus retracting the piston 20 and releasing the brake. In this instance, the solenoid 268 of the parking brake mechanism 25F is not energized, so that the engaging pawl 261 at the forward end of the pivot arm 262 is maintained in a slightly spaced relationship to the tooth portions of the ratchet 260 on the rotor 225 of the motor 211.

Therefore, the rotor 225 smoothly rotates in the direction R for releasing the brake. Thus, releasing the electric brake can be ensured.

(F2) Operation when the Brake Pads Become Worn:

When wear on the brake pads exists, a controller is actuated, for example, by a switching operation before start-up of the automobile, and the motor 211 is operated in response to a command signal from the controller to the point that generates a thrusting force, which point is confirmed by means of a thrusting force detection sensor (no reference numeral therefor is indicated). Therefore, an amount of pad wear can be determined by subtracting an angle of rotation corresponding to the pad clearance from an angle of rotation of the rotor 225 (an angle of rotation of the first disc 237) during this operation of the motor. Then, the controller operates to rotate the rotor 225 of the motor 211, that is, the first disc 237, in a direction opposite to the direction for braking from the initial position through an angle corresponding to the amount of pad wear. The second disc 239 follows this rotation of the first disc 237 (performs rotation in the reverse direction).

The one-way clutch 253 of the pad wear compensation mechanism 24F slips relative to the reverse rotation of the second disc 239. Therefore, the adjuster 241 does not rotate, and therefore the position of the piston 210 is unchanged. Thereafter, the motor 211 is operated to rotate the first disc 237 in the direction for a thrust movement of the piston, through an angle equal to that of the reverse rotation performed in the above-mentioned manner. In this instance, the second disc 239 follows the movement of the first disc 237 (performs rotation in the normal direction), to thereby fasten the one-way clutch 253 and rotate the adjuster 241. When the adjuster 241 rotates, the piston 210 threadably engaged with the adjuster 241 advances to a position such that the pad clearance only is left. Thereafter, as in the case of normal braking, the piston 210 reciprocally moves according to the direction of rotation of the first disc 237, thus applying and releasing the brake.

(F3) Operation in the Event of Malfunctioning of a Motor:

If the motor 211 malfunctions during normal braking, the first disc 237 of the ball ramp mechanism 22F is rotated in a direction opposite to the direction for braking, due to the effect of the torque which has been accumulated in the coil spring 215 as the brake releasing mechanism during braking. Then, as in the case of releasing the normal brake, the balls 238 return to their initial positions in the ball grooves 240, so that the second disc 239 and the adjuster 241 of the pad wear compensation mechanism 24F are returned as a unit and the piston 210 is retracted. In this instance, since sufficient torque is accumulated in the coil spring 215, the first disc 237 returns to the initial angular position. Therefore, the piston 210 returns to a position such that the predetermined pad clearance is formed between the piston 210 and the brake pad 5, that is, a position at which no thrusting force remains in the piston, to thereby completely release the brake.

(F4a) Operation for Applying the Parking Brake:

To apply the parking brake, the controller is actuated in response to a signal indicative of the driver's operation for applying the parking brake, and the rotor 225 of the motor 211 is rotated in the direction L for braking. As in the case of the above-mentioned operation for applying the brake, the piston 210 thrusts, to thereby generate a braking force. Subsequently, when the braking force reaches a predetermined level, the controller (not shown) operates the drive circuit (not shown) to energize the coil 265 of the solenoid 268 in the parking brake mechanism 25F for a short period of time, followed by deenergization of the motor 211. By energizing the coil 265 of the solenoid 268 for a short period of time, the plunger 267 is retracted into the housing 266 against the force of the torsion spring 272, and the pivot arm 262 is pivotally moved about the pivotal axis (the pin 271) in the counter-clockwise direction in FIG. 16. Consequently, the engaging pawl 261 at the forward end of the pivot arm 262 fits against (engages) the tooth portion 264 of the ratchet 260 on the rotor 225 of the motor 211. Thus, the rotor 225 is prevented from rotating in the direction R for releasing the brake. As a result, the parking brake is secured.

In this embodiment, when the motor 211 is deenergized, a torque acting in the clockwise direction R is generated in the rotor 225 of the motor 211 due to the effect of rigidity of the caliper or the like. Therefore, the engaging pawl 261 is strongly urged against the tooth face 264a of the ratchet 260. Therefore, the parking brake can be secured in a more stable manner.

(F4b) Operation for Releasing the Parking Brake:

To release the parking brake, the motor 211 is energized according to the driver's operation for releasing the parking brake. As in the case of normal braking, the rotor 225 is rotated slightly in the direction L for braking. The ratchet 260 of the parking brake mechanism 25F also rotates with the rotor 225 slightly in the direction L for braking. As a result, the force that urges the engaging pawl 261 against the tooth face 264a is released. In this instance, since the coil 265 of the solenoid 268 is non-energized, the pivot arm 262 pivotally moves in the clockwise direction in FIG. 16 under force of the torsion spring 272 as a result of releasing the force from the engaging pawl 261. Thus, the engaging pawl 261 is disengaged from the tooth portion 264 of the ratchet 260. Thereafter, by rotating the rotor 225 of the motor 211 in the direction R for releasing the brake with an appropriate timing, the rotor 225 is rotated in the direction R for releasing the brake without making contact with the engaging pawl 261, thus releasing the parking brake.

In this embodiment, the energization of the solenoid 268 is conducted only when the parking brake is applied. This achieves a reduction in power consumption, an increase of life, and a reduction in size of the solenoid. Further, a number of components of the parking brake mechanism 25F are formed into the drive unit 263 as a subassembly before being assembled to the caliper body 207. Therefore, ease of assembly can be considerably increased.

(F5) Operation for Manually Releasing the Parking Brake:

As has been explained in item (F4b) above, by energizing the motor 211 for a short period of time according to the driver's operation for releasing the parking brake, the ratchet 260 is slightly rotated in the direction L for braking, thus releasing the force that urges the engaging pawl 261 against the tooth face 264a, and pivotally rotating the pivot arm 262 under force of the torsion spring 272 in the clockwise direction in FIG. 16. Consequently, the engaging pawl 261 is disengaged from the tooth portion 264, and the rotor 225 becomes capable of freely rotating in the direction R for releasing the brake, without being restrained by the engaging pawl 261. That is, the parking brake is released.

However, when the parking brake mechanism 25F is operated [when the parking brake is applied (namely, the engaging pawl forward end portion 261 is engaged with the tooth portion 264)], if the supply of current to the motor 211 becomes impossible due to breaking of a cable for supplying current to the motor 211, an emergency action to release the parking brake can be conducted manually by using the tool 322.

That is, the watertight bolt 303 and the packing 302 are detached from the caliper guide hole 301, and the tool 322 is inserted into the guide hole 305. The tool 322 is inserted through the guide hole 305 until the forward end portion thereof abuts against the tooth face 264a. By further moving the tool 322 in the guide hole 305, the ratchet 260 is rotated in the direction L for braking. Due to the rotation of the ratchet 260 in the direction L for braking, the force that urges the engaging pawl 261 against the tooth face 264a is released, and the pivot arm 262 pivotally moves in the clockwise direction in FIG. 17 under force of the torsion spring 272. Then, in the same manner as described in item (F4b) above, the parking brake is released, and the vehicle can be moved as a temporary action.

As has been described above, the normal release of the parking brake using the tool 322 can be effected simply by inserting the tool 322 into the guide hole 305. Therefore, no cumbersome operation is necessary, and thus releasing the parking brake can be rapidly and easily conducted. This is enabled simply by forming the guide hole 305 and preparing the watertight bolt 303 and the packing 302 to be threadably engaged with the guide hole 305 and the tool 322 to be inserted into the packing and the guide hole 305. Thus, no complicated structure is required for achieving manual release of the parking brake.

What is claimed is:

1. An electric brake comprising:
a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force; and
a parking brake mechanism accommodated in a housing, the parking brake mechanism including an engaging structure capable of being engaged with an associated-movement portion which rotates in association with the motor, and a bias device for biasing the engaging structure in a direction for disengagement of the engaging structure from the associated-movement portion, the parking brake mechanism being capable of exerting a parking brake function through engagement and disengagement of the engaging structure relative to the associated-movement portion, the disengagement of the engaging structure being effected by temporarily rotating the associated-movement portion in a braking direction such that a braking force is generated when the engaging structure is engaged with the associated-movement portion to thereby move the engaging structure in the direction for disengagement under a biasing force of the bias device, wherein:
a force-receiving portion is provided on a side of the associated-movement portion, the force-receiving portion being adapted to rotate the associated-movement portion in the braking direction upon receiving a force in the braking direction to thereby enable the disengagement of the engaging structure relative to the associated-movement portion under the biasing force of the bias device; and
the housing includes an opening through which a force-applying member is inserted, the force-applying member being manually operable from an outside of the housing to thereby apply, to the force-receiving portion, a force in the braking direction such that the associated-movement portion is rotated in the braking direction, the opening being provided such that the outside of the housing is communicated with an inside of the housing.

2. An electric brake according to claim 1, wherein the bias device constitutes a holding mechanism arranged to maintain the engaging structure in a disengagement condition relative to the associated-movement portion in response to the disengagement of the engaging structure by the force-applying member.

3. An electric brake according to claim 1, wherein the associated-movement portion comprises a ratchet which rotates in association with the rotation of the motor, and the engaging structure comprises an engaging pawl that is disposed at a periphery of the ratchet so as to be capable of engaging a tooth portion of the ratchet.

4. An electric brake according to claim 3, wherein:
the force-receiving portion is formed at an outer peripheral portion of the ratchet, the outer peripheral portion of the ratchet being located along a line of extension of the opening through which the force-applying member can be inserted; and
the ratchet is capable of being rotated in the braking direction, by means of the force-applying member inserted through the opening.

5. An electric brake according to claim 4, further comprising an actuator adapted to forcibly move the engaging pawl in a direction for engagement with the ratchet against the force of the bias device.

6. An electric brake according to claim 1, wherein the housing further includes a cap member adapted to seal the opening, the cap member being detachable such that when the disengagement of the engaging structure relative to the associated-movement portion cannot be effected by operation of the motor, the cap is detached from the opening and the force-applying member is inserted via the opening so as to apply a rotational force via the force-receiving portion to the associated-movement portion to rotate the associated-movement portion in the braking direction.

7. An electric brake comprising:
a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force; and
a parking brake mechanism accommodated in a housing, the parking brake mechanism including an engaging structure capable of being engaged with an associated-movement portion which rotates in association with the motor, and a bias device for biasing the engaging structure in a direction for disengagement of the engaging structure from the associated-movement portion, the parking brake mechanism being capable of exerting a parking brake function through engagement and disengagement of the engaging structure relative to the associated-movement portion, the disengagement of the engaging structure being effected by temporarily rotating the associated-movement portion in a braking direction when the engaging structure is engaged with the associated-movement portion to thereby move the engaging structure in the direction for disengagement under a biasing force of the bias device, wherein:

a force-receiving portion is provided on a side of the associated-movement portion, the force-receiving portion being adapted to rotate the associated-movement portion in the braking direction such that a braking force is generated upon receiving a force in the braking direction to thereby enable the disengagement of the engaging structure relative to the associated-movement portion under the biasing force of the bias device;

the housing includes an opening through which a force-applying member can be inserted, the force-applying member being manually operable from an outside of the housing to thereby apply a force in the braking direction to the force-receiving portion, such that the associated-movement portion is rotated in the braking direction, the opening being provided such that the outside of the housing is communicated with an inside of the housing; and the housing further includes a cap member adapted to seal the opening, the cap being detachable from the opening such that the force-applying member can be inserted via the opening from the outside of the housing to the inside of the housing.

8. An electric brake according to claim 7, wherein the bias device constitutes a holding mechanism arranged to maintain the engaging structure in a disengagement condition relative to the associated-movement portion in response to the disengagement of the engaging structure by the force-applying member.

9. An electric brake according to claim 7, wherein the associated-movement portion comprises a ratchet which rotates in association with the rotation of the motor, and the engaging structure comprises an engaging pawl that is disposed at a periphery of the ratchet so as to be capable of engaging a tooth portion of the ratchet.

10. An electric brake according to claim 9, wherein the bias device constitutes a holding mechanism arranged to maintain the engaging pawl in a disengagement condition relative to the ratchet in response to the disengagement of the engaging pawl relative to the ratchet due to the rotation of the ratchet by the force-applying member in the braking direction.

11. An electric brake according to claim 10, wherein the bias device includes a torsion spring arranged to bias the engaging pawl in a direction for disengagement of the engaging pawl from the ratchet.

12. An electric brake according to claim 9, wherein:
the force-receiving portion is formed at an outer peripheral portion of the ratchet, the outer peripheral portion of the ratchet being located along a line of extension of the opening through which the force-applying member can be inserted; and
the ratchet is capable of being rotated in the braking direction, by means of the force-applying member inserted through the opening.

13. An electric brake according to claim 12, further comprising an actuator adapted to forcibly move the engaging pawl in a direction for engagement with the ratchet against the force of the bias device.

14. An electric brake comprising:
a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force;
a parking brake mechanism accommodated in a housing and including a ratchet which rotates in association with the motor and has a plurality of tooth portions on a peripheral portion thereof, a pivot arm having an engaging pawl capable of being engaged with the tooth portions of the ratchet, and a bias device adapted to bias the pivot arm in a direction for disengagement of the engaging pawl from the tooth portions of the ratchet, the parking brake mechanism being capable of exerting a parking brake function through engagement and disengagement of the engaging pawl relative to the tooth portions of the ratchet; and
an actuator including a coil and a plunger capable of displacement under an electromagnetic force generated by energization of the coil, the actuator being adapted to enable the engagement of the engaging pawl relative to the tooth portions of the ratchet according to the displacement of the plunger, wherein:
a force-receiving portion is provided on the ratchet, the force-receiving portion being adapted to rotate the ratchet in a braking direction such that a braking force is generated upon receiving a force in the braking direction to thereby enable the disengagement of the engaging pawl relative to the tooth portions of the ratchet under a biasing force of the bias device;
the housing includes an opening through which a force-applying member can be inserted, the force-applying member being manually operable from an outside of the housing to thereby apply a force in the braking direction to the force-receiving portion such that the ratchet is rotated in the braking direction, the opening being provided such that the outside of the housing is communicated with an inside of the housing; and
the housing further includes a cap member adapted to seal the opening, the cap member being detachable such that, when the cap seals the opening the force-applying member cannot apply a force to a force-receiving portion so as to prevent the disengagement of the engaging pawl relative to the tooth portions of the ratchet by the force-applying member, and when the cap is detached from the opening the force-applying member can apply a force in the braking direction to the force-receiving portion such that the ratchet can be rotated in the braking direction so as to enable the disengagement of the engaging pawl relative to the tooth portions of the ratchet by the force-applying member.

15. An electric brake according to claim 14, wherein:
the force-receiving portion is formed at an outer peripheral portion of the ratchet, the outer peripheral portion of the ratchet being located along a line of extension of the opening through which the force-applying member can be inserted; and
the ratchet is capable of being rotated in the braking direction, by means of the force-applying member inserted through the opening.

16. An electric brake comprising:
a caliper having provided therein a motor, a rotary-linear motion conversion mechanism for converting rotation of the motor to a linear motion and a piston adapted to press a brake pad against a disc rotor according to a force transmitted from the rotary-linear motion conversion mechanism and thus generate a braking force; and a parking brake mechanism accommodated in a housing, the parking brake mechanism including an engaging structure capable of being engaged with an associated-movement portion which rotates in association with the motor, and a spring for biasing the engaging structure in a direction for disengagement of the engaging structure from the associated-movement portion, the parking brake mechanism being capable of exerting a parking brake function through engagement and disengagement of the engaging structure relative to the associated-movement portion, the disengagement of the engaging structure being effected by operating the motor to rotate the associated-movement portion in a braking direction when the engaging structure is engaged with the associated-movement portion to thereby move the engaging structure in the direction for disengagement under a biasing force of the spring, wherein:

the housing includes an opening through which a force-applying member can be inserted, the force-applying member being manually operable from an outside of the housing to thereby apply a rotational force in the braking direction to the associated-movement portion, the opening being provided such that the outside of the housing is communicated with an inside of the housing, and the associated-movement portion rotates in the braking direction upon receiving the rotational force in the braking direction by the force-applying member from the outside of the housing, in addition to a rotational force of the motor, to enable the disengagement of the engaging structure relative to the associated-movement portion under the biasing force of the spring.

17. An electric brake according to claim 16, wherein:

the electric brake further comprises a force-receiving portion being adapted to receive a force in the braking direction from the force-applying member such that the associated-movement portion can be rotated in the braking direction; and the housing further includes a cap member adapted to seal the opening, the cap member being detachable such that when the disengagement of the engaging structure relative to the associated-movement portion cannot be effected by operation of the motor, the cap is detached from the opening and the force-applying member can be inserted via the opening so as to apply the rotational force via the force-receiving portion to the associated-movement portion to rotate the associated-movement portion in the braking direction.

18. An electric brake according to claim 17, wherein the associated-movement portion comprises a ratchet which rotates in association with the rotation of the motor, the ratchet having a plurality of tooth portions which constitutes the force-receiving portion, wherein the engaging structure comprises an engaging pawl that is disposed at a periphery of the ratchet so as to be capable of engaging the tooth portions of the ratchet, and wherein a spring is arranged so as to bias the engaging pawl in a direction for disengagement of the engaging pawl from the ratchet.

19. An electric brake according to claim 16, wherein the associated-movement portion comprises a ratchet which rotates in association with the rotation of the motor, the ratchet having a tooth portion, wherein the engaging structure comprises an engaging pawl that is disposed at a periphery of the ratchet so as to be capable of engaging the tooth portion of the ratchet, the electric brake further comprising:

an actuator adapted to forcibly move the engaging pawl in a direction for engagement with the ratchet against the force of the spring, the spring being arranged to bias the engaging pawl in a direction for disengagement of the engaging pawl from the ratchet.

20. An electric brake according to claim 16, wherein the housing further includes a cap member adapted to seal the opening, the cap member being detachable such that when the disengagement of the engaging structure relative to the associated-movement portion cannot be effected by operation of the motor, the cap is detached from the opening and the force-applying member is inserted via the opening so as to apply a rotational force via the force-receiving portion to the associated-movement portion to rotate the associated-movement portion in the braking direction.

* * * * *